June 4, 1957  R. L. SMIRL  2,794,349
TRANSMISSION
Filed May 21, 1949  7 Sheets-Sheet 1
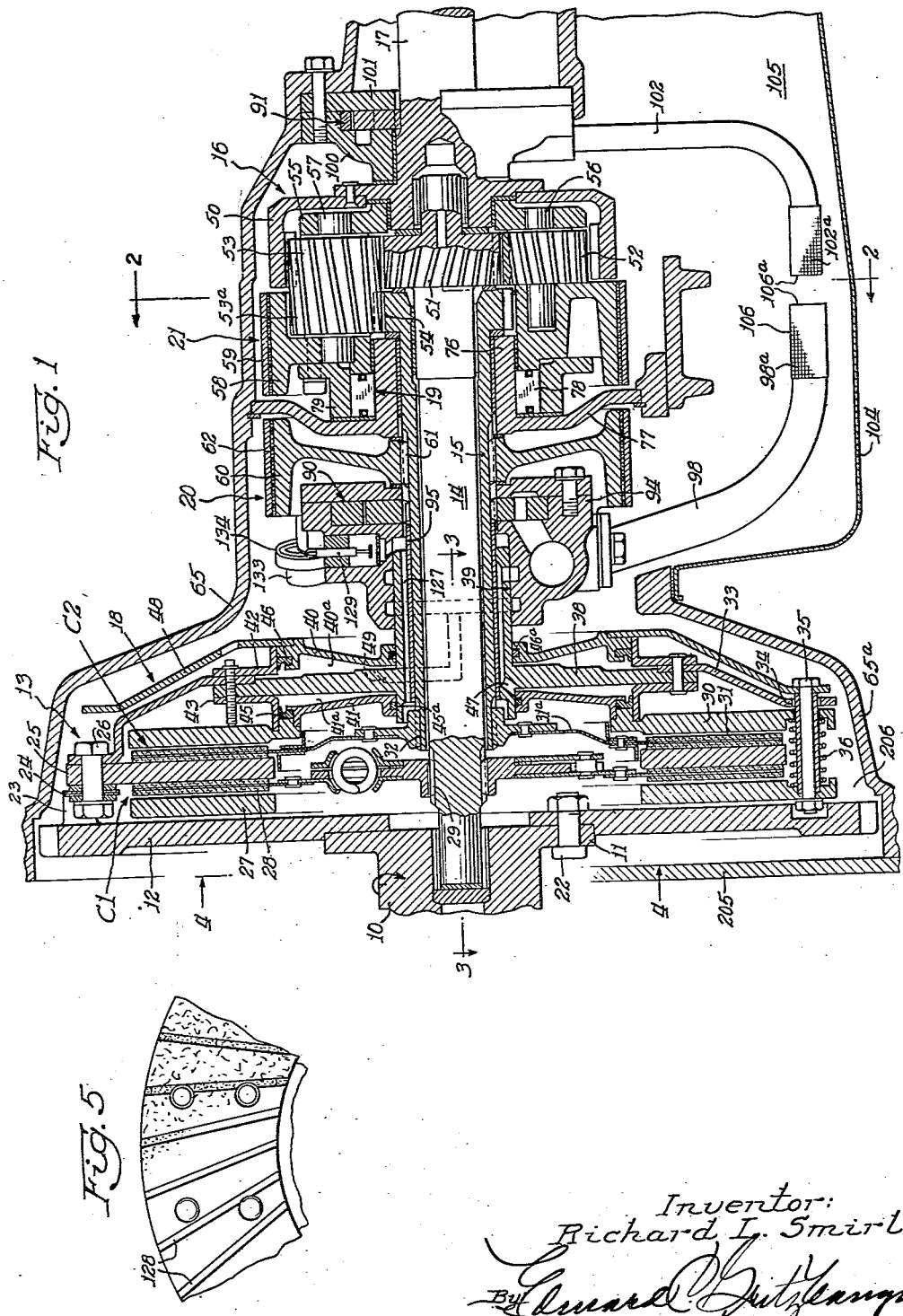
Inventor:
Richard L. Smirl
By Edward Gritzbaugh
Atty.

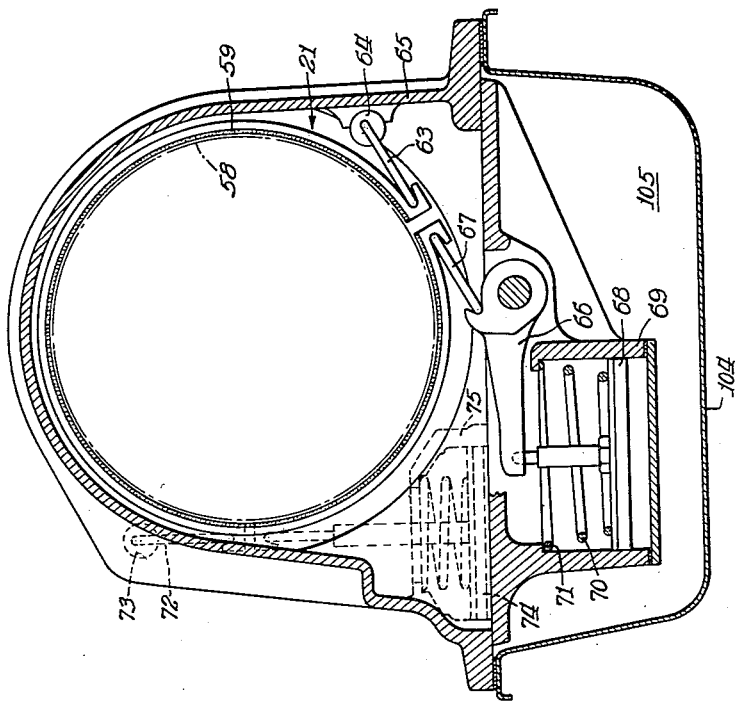
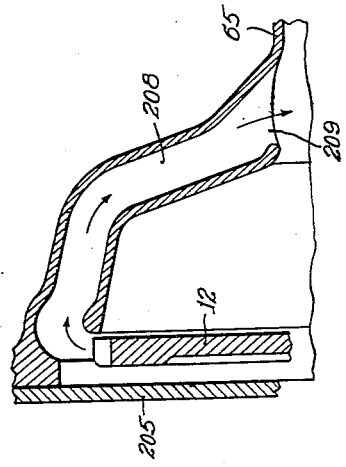
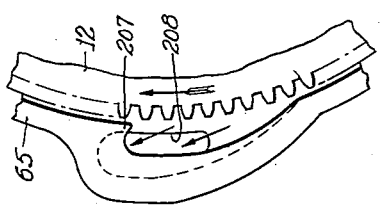

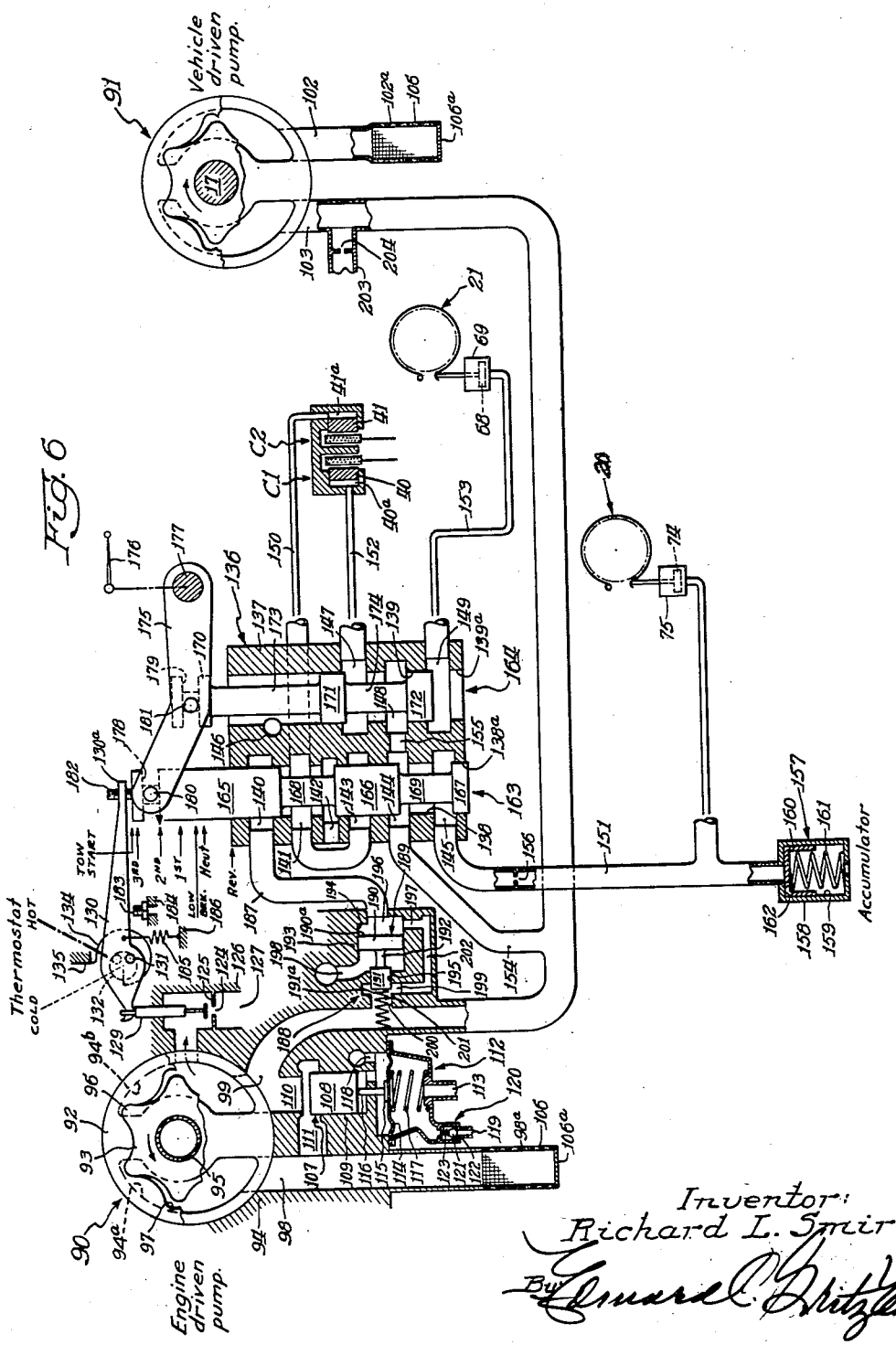

June 4, 1957  R. L. SMIRL  2,794,349
TRANSMISSION
Filed May 21, 1949  7 Sheets-Sheet 4
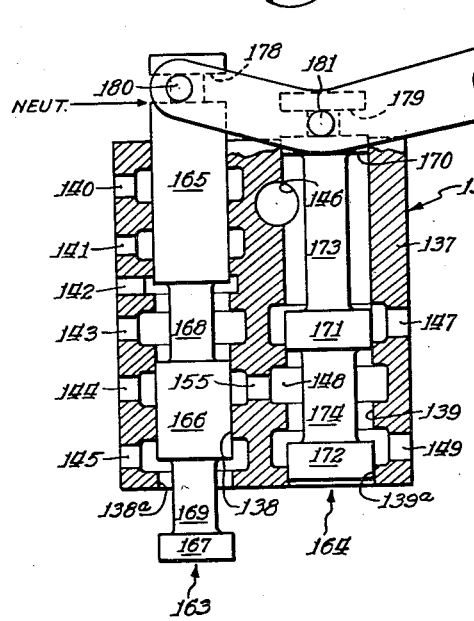
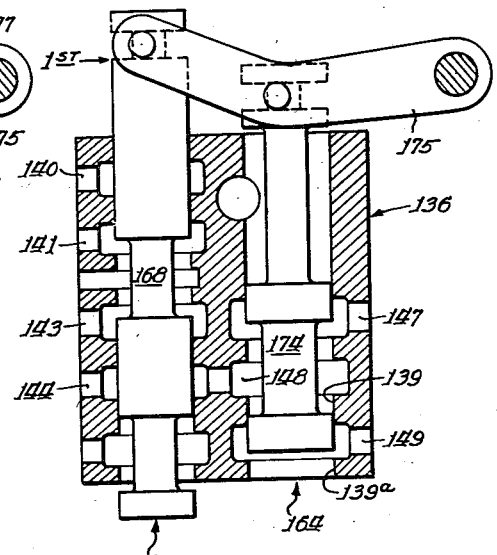
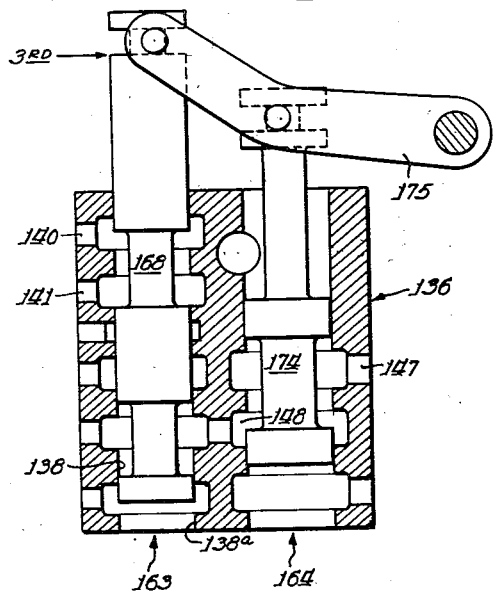
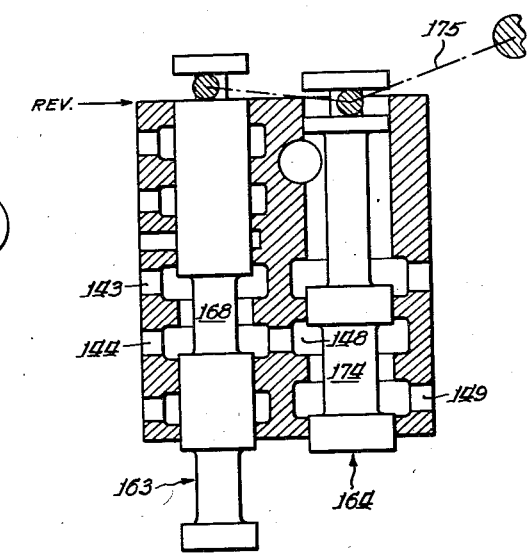
Inventor:
Richard L. Smirl June 4, 1957  R. L. SMIRL  2,794,349
TRANSMISSION
Filed May 21, 1949  7 Sheets-Sheet 5

Inventor:
Richard L. Smirl

June 4, 1957
R. L. SMIRL
2,794,349
TRANSMISSION
Filed May 21, 1949
7 Sheets-Sheet 6
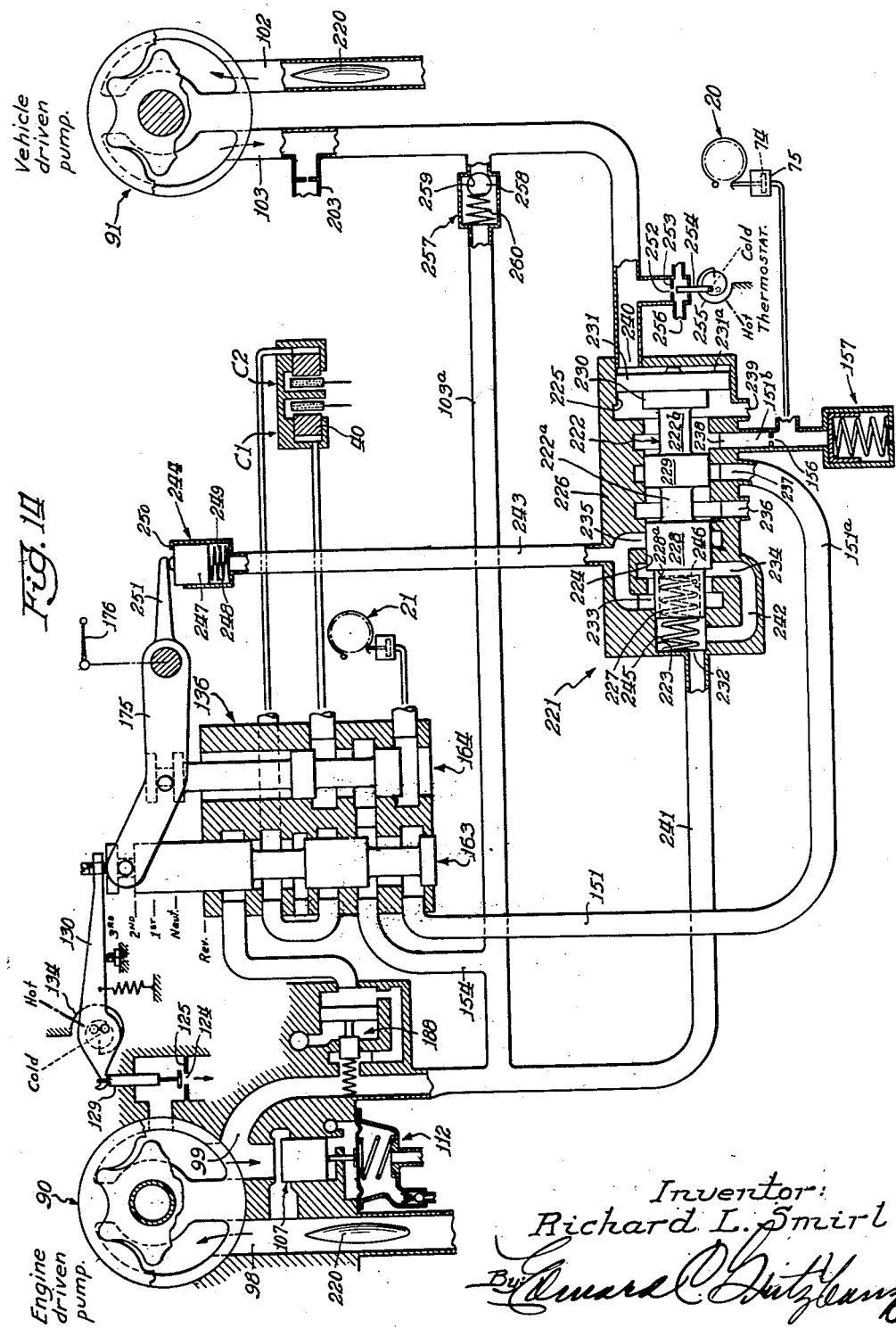
Inventor:
Richard L. Smirl

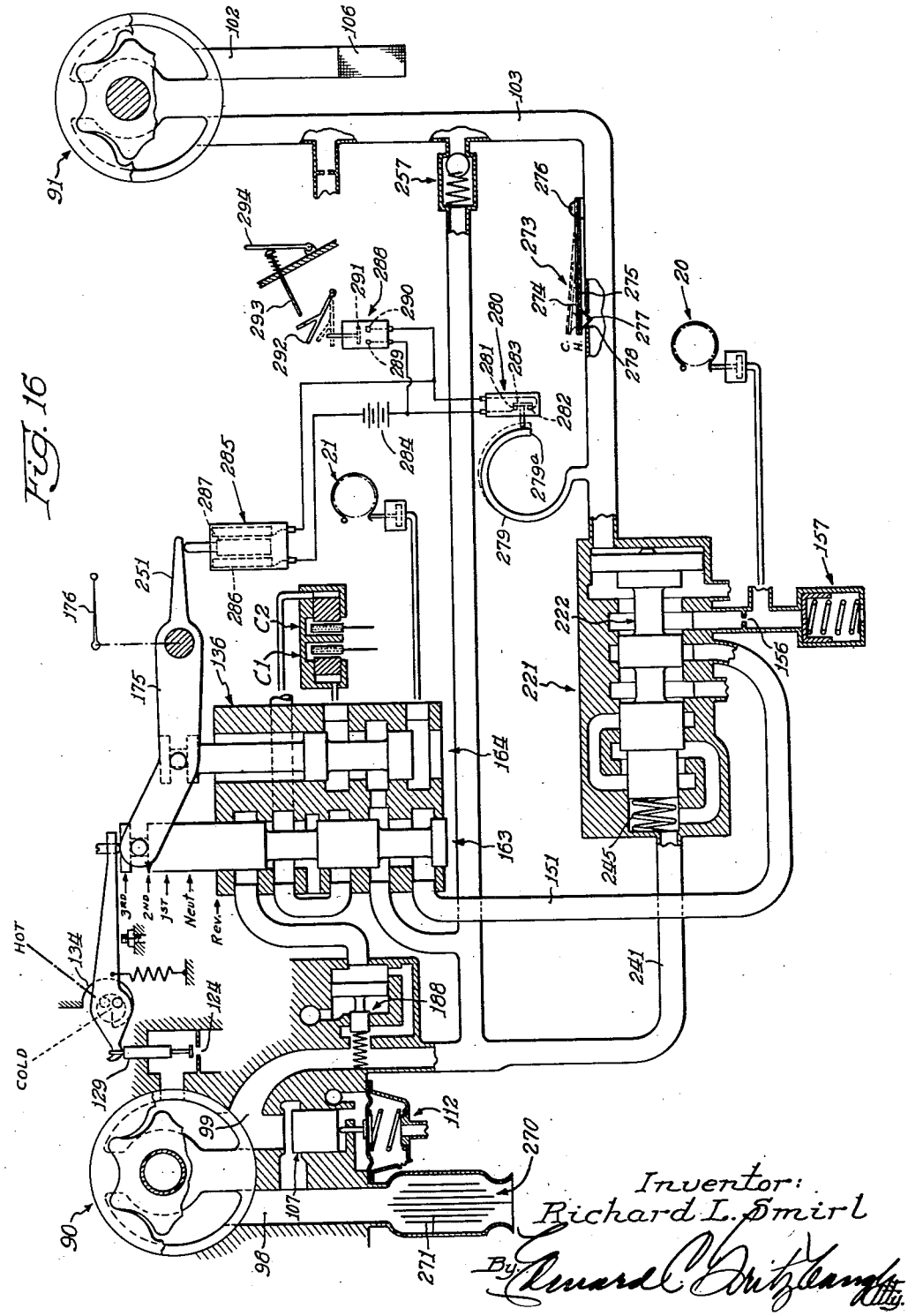

United States Patent Office 2,794,349
Patented June 4, 1957

2,794,349
TRANSMISSION

Richard L. Smirl, Chicago, Ill., assignor to Borg-Warner Corporation, Chicago, Ill., a corporation of Illinois Application May 21, 1949, Serial No. 94,580

43 Claims. (Cl. 74—752)

My invention relates to transmissions particularly adapted for use in automotive vehicles and more specifically to controls for such transmissions.

It is an object of the invention to provide an improved transmission control arrangement for engaging a friction engaging means adapted to complete a power train through a transmission, such engagement being in accordance with the speed of the drive shaft of the transmission so as to provide a smooth start for a vehicle equipped with the transmission. It is more particularly an object to provide fluid pressure responsive means for engaging the friction engaging means and to provide mechanism for applying a fluid pressure such as oil pressure on said fluid pressure responsive means that increases in accordance with drive shaft speed, such mechanism preferably including a pump driven by the transmission drive shaft having its output relieved through a sharp edged orifice for causing the pressure to vary in this manner.

As is well known, the viscosity of oil, which is preferably the medium used for engaging the friction engaging means, varies with its temperature, and in connection with such a pressure regulating means comprising an orifice, it is an object of the invention to provide compensating means which is operative to maintain substantially the same fluid pressures regardless of changes in viscosity due to temperature changes. In this connection it is an object to provide such an orifice in a thin plate which promotes turbulence in the liquid as it flows through the orifice and which in itself compensates to some extent for changes in oil viscosity with temperature. It is also an object to provide thermostatic means in connection with the orifice which operates to close the orifice to a more or less extent with an increase in temperature of the oil, and it is a further object to provide in the pump intake a viscous liquid restriction which provides a substantial fluid impediment due to the flow of fluid over a relatively large area of the restriction, the viscous restriction and thermostatic means cooperating with the thin plate orifice to compensate for changes in temperature and viscosity of the oil over quite a large range.

It is an other object of the invention to provide similarly temperature compensated pressure supplying means for shifting the transmission from one speed ratio to another in accordance with the speed of the driven shaft of the transmission and of the vehicle. It is contemplated that the pump in this case shall be driven by the transmission driven shaft and the pressure output of the pump is to be impressed on a fluid pressure responsive shift valve for performing the shifting function.

It is another object of the invention to provide an improved compact valve mechanism for controlling the transmission, and in connection with the valving, it is an object of the invention to provide mechanism for closing, at least to some extent, the orifice above mentioned when the transmission is shifted into higher speed ratios, since in such ratios the discharge through the orifice is not effective for any particular purpose. It is also contemplated that the orifice may be completely closed on suitable adjustments of the valving so that the pump driven by the driven shaft of the transmission may be utilized for engaging the power train completing friction engaging means to complete a drive from the driven shaft of the transmission to the drive shaft in order that the vehicle engine may be started by pushing or towing the vehicle.

It is an object of the invention to utilize a transmission having two friction engaging means for completing an initial driving train through the transmission, and it is an object to so arrange the transmission controls that when the transmission is shifted to complete this initial drive, one of the friction engaging means will be engaged prior to the other, so that it is always the latter that actually completes the drive through the transmission for this particular power train. More specifically, it is contemplated that a friction brake and a friction clutch must both be engaged to complete a reverse drive through the transmission and that the valve means for controlling the engagements of the clutch and brake shall be effective to provide an engagement of the brake in the neutral condition of the valving as well as in its reverse drive position for this purpose.

It is an object to provide a manual control for the shift valving of the transmission mentioned above and to provide automatic means for moving the manual control from a high speed ratio position to a low speed ratio position when the speed of the vehicle decreases below a predetermined value. It is contemplated that the mechanism for shifting the selector lever may be under the control of the driven shaft pump mentioned above.

It is another object of the invention to provide mechanism under the control of the vehicle accelerator which is also effective to move the manual transmission control from a high ratio position to a low ratio position when the accelerator is moved to an open throttle kickdown position.

The invention consists of the novel constructions, arrangements and devices to be hereinafter described and claimed for carrying out the above-stated objects and such other objects as will appear from the following description of preferred embodiments of the invention illustrated with reference to the accompanying drawings, wherein:

Fig. 1 is a longitudinal, sectional view of a transmission with which my improved controls may be used;

Fig. 2 is an elevational view of a brake in the transmission and the actuating mechanism therefor taken from line 2—2 of Fig. 1;

Fig. 3 is a sectional view of a portion of the transmission casing taken on line 3—3 of Fig. 1;

Fig. 4 is an elevational view of the portion of the transmission casing illustrated in Fig. 3 and taken from line 4—4 of Fig. 1;

Fig. 5 is an elevational view of a driven clutch element in the transmission illustrated in Fig. 1;

Fig. 6 is a diagrammatic illustration of one embodiment of my improved controls for the transmission shown in Figs. 1 to 5;

Figs. 7, 8, 9, 10, 11 and 12 are views showing certain of the valves in the Fig. 6 arrangement in different positions of the valves for various drives through the transmission;

Fig. 14 is a diagrammatic illustration of a modified transmission control arrangement;

Fig. 16 is a diagrammatic illustration of still another modified transmission control arrangement.

Like characters of reference in the following description designate like parts in the several views of the drawings.

Figure 11:
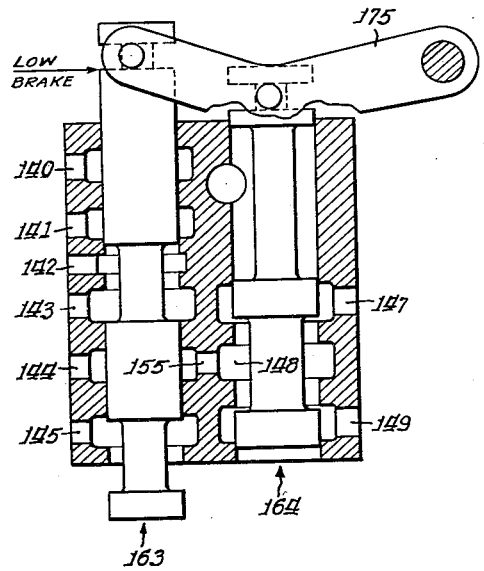

The transmission shown and described herein, exclusive of its controls, is shown and described also in my copending application, Serial No. 84,581, filed March 31, 1949. Referring now to Fig. 1, the transmission may be seen to comprise a drive shaft 10 which may be the rear extremity of an engine crank shaft, and the shaft 10 is provided with a radial flange 11 to which is bolted the flywheel 12. The flywheel 12 is adapted to support the driving members or plates of a multiple plate clutch assembly indicated generally at 13 engageable with driven friction plates of the assembly respectively keyed to a shaft 14 and a quill shaft 15 which are drivingly connected to members of a planetary gear set generally indicated at 16. The gear set 16 is connected to a driven shaft 17 transmitting drive to the rear wheels of an automobile. Engagement of the driving plates and driven plates of the multiple clutch assembly 13 is effected by means of a fluid pressure actuated mechanism indicated generally at 18. The clutch operating mechanism 18 is effective to alternately or successively effect engagement of the clutches C–1 and C–2 forming the multiple clutch assembly 13 to transmit torque from the driving shaft 10 to either or both of the shafts 14 and 15 connected to the planetary gear set 16. Suitable controls, which will be more specifically described hereinafter, are provided for the planetary gear set 16 to effect operation thereof to provide different forward speed ratio drives and reverse drive.

Suitable controlling mechanisms are provided for the planetary gear set 16 to effect operation thereof to provide different forward speed ratio drives and reverse drive. These controls comprise a free wheeling or overrunning brake device 19 to provide a low speed ratio, a friction type brake 20 for the second or intermediate speed ratio and another friction type brake 21 for establishing reverse drive of the driven shaft 17, the controlling mechanisms 19, 20 and 21 operating on various reaction elements of the planetary gear set 16 in a manner hereinafter described.

Referring more particularly to Figs. 1 and 2 of the drawings for a more detailed description of the transmission, the flywheel 12 is bolted to the flange 11 of the drive shaft 10 by a plurality of bolts, one of which is shown at 22. The flywheel 12 is provided with a plurality of circumferentially spaced lugs 23 at one side thereof, and each lug has secured thereto a plurality of flexible steel straps 24 connected to the driven plate 25 of the clutch assembly 13 by means of bolt and nut assemblies 26. The driven plate 25 is common to and may be considered as one of the driving members of either the clutch C–1 or the clutch C–2. The clutch C–1 further comprises a pressure plate 27 and a driven plate 28 disposed between the plates 27 and 25 and having its hub splined as at 29 to the shaft 14. The clutch C–2 also comprises a pressure plate 30 and a driven plate 31 disposed between the plates 30 and 25 and having its hub splined as at 32 to the quill shaft 15.

The pressure plates 27 and 30 are connected to the flywheel 12 for rotation therewith by means of a dished sheet metal stamping or plate 33 provided with a plurality of circumferentially spaced openings at its outer periphery for receiving therein the bolts of the bolt and nut assemblies 26 to drivingly connect the flywheel 12 to the plate 33, and the plate 33 is also provided with other circumferentially spaced openings indicated at 34 for receiving the bolts of the bolt and nut assemblies 35, the bolts extending through openings in the pressure plates 27 and 30 to provide a driving connection between the plate 33 and the pressure plates. Disposed between the pressure plates 27 and 30 are a plurality of springs, one of which is indicated at 36, surrounding the bolt and nut assemblies 35 and operative to normally move the pressure plates out of engagement with the driven clutch plates 28 and 31.

The fluid operated actuating mechanism 18 is utilized to effect axial movement of the pressure plates 27 and 30 toward the intermediate plate 25 for engagement of these plates with the driven clutch plates 28 and 31. The actuating mechanism 18 comprises an annular pressure fluid distributing member or plate 38 having at its radially inner extremity an axially extending hub 39 rotatably mounted on the quill shaft 15. Disposed at opposite sides of the annular member 38 are pistons 40 and 41 each comprising an annular dished plate having an inner extremity slidably engaging the hub 39 of the plate 38. The outer extremities of the pistons 40 and 41 are disposed adjacent rings 42 and 43, respectively, of angular cross-section which are secured to the plate 38 and drive plate 33 by rivets as shown. Suitable seals 45, 45a, 46 and 46a prevent the escape of fluid from the two pressure fluid chambers 40a and 41a defined by the distributor plate 38 and pistons 40 and 41.

The piston 41 engages the inner periphery of the pressure plate 30 and upon the entrance of pressure fluid through the passage 47 in the distributor plate 38 and into the chamber 41a, the piston 41 will move the plate 30 into engagement with the driven clutch plate 31 to establish a driving connection between the driving shaft 10 and the quill shaft 15.

The piston 40 has an annular actuating plate 48 connected thereto as shown, and the plate 48 is provided with a series of openings in its outer margin receiving the bolts of the bolt and nut assemblies 35, so that upon the entrance of fluid under pressure through the opening 49 in the distributor plate 38, the piston 40 will move to the right as viewed in Fig. 1 to move the nut and bolt assemblies 35 and thereby move the pressure plate 27 into engagement with the driven clutch plate 28 to establish a driving connection between the driving shaft 10 and the shaft 14. Suitable controls which will be hereinafter described may be provided for controlling the flow of fluid under pressure to either or both of the passages 47 and 49 in the distributor plate 38 to effect alternate or successive engagement of the pressure plates 27 and 30 with the driven clutch plates 28 and 31 to drivingly connect the driving shaft 10 and either or both of the shafts 14 and 15 as desired.

The planetary gear set 16 comprises a ring gear 50 and a sun gear 51 and planet gears 52 and 53. The gears 52 and 53 mesh with each other, and the planet gear 53 meshes also with the ring gear 50, and the planet gear 52 meshes also with the sun gear 51. A second sun gear 54 is provided in mesh with the planet gear 53. The planet gears 53 are elongated pinions having gear portions 53a meshing with the sun gear 54. The planet gears 52 and 53 are carried by a planet gear carrier 55 respectively by means of shafts 56 and 57 in the carrier. The gears of the planetary gear set 16 have helical teeth as shown.

The ring gear 50 is connected to the driven shaft 17 of the transmission; the sun gear 51 is formed as an integral end portion of the shaft 14 and the sun gear 54 is an integral end portion of the quill shaft 15. The planet gear carrier 55 is rotatably disposed with respect to the shafts 14, 15 and 17, and it will be noted that of the shaft 17 at its end adjacent the sun gear 51 has a mounting portion for rotatably supporting the carrier 55.

The planet gear carrier 55 can be prevented from rotating by means of the brake 21. The brake 21 comprises a drum 58 formed on the carrier 55 and a friction band 59 surrounding the brake drum 58. The brake 21 is utilized to complete a reverse drive power train, as will be described hereinafter in greater detail. The brake 20 comprises a brake drum 60 splined as at 61 to the quill shaft 15, and thereby rotatable therewith, and a brake band 62 engageable with the brake drum 60 to prevent rotation of the quill shaft 15 and thereby the sun gear 54 to complete a forward drive power train as will be described hereinafter.

Referring to Fig. 2, the brake band 59 of the brake 21 has a reversely bent end thereof receiving one end of a strut 63 which is anchored at 64 to a stationary portion of the transmission housing 65, and the band 59 almost completely encircles the drum 58. The band 59 is adapted to engage the drum 58 by actuation of a lever 66 pivotally mounted on the housing 65 and engaging and urging a strut 67 within the adjacent reversely bent end of the band toward the opposite end of the band. The lever 66 is connected to a piston 68 in a cylinder 69 of a fluid pressure device, and the lever is rotated about its pivotal connection to the transmission housing upon the admission of pressure fluid into the cylinder 69 and consequent actuation of the piston 68. A spring 70 is provided between a shoulder 71 on one end of the cylinder 69 and the piston 68 for yieldingly holding the piston in its brake disengaging position.

The brake band 62 of the brake 20 is similar to the brake band 59 and has one end connected to a strut 72 anchored as at 73 to the transmission housing. The brake band 62 is applied to the brake drum 60 by means of a fluid pressure device having a piston 74 in a cylinder 75 with the piston rod of the piston acting directly on one end of the brake band 62 upon the admission of pressure fluid into the cylinder 75 to draw the ends of the brake band 62 together to grip the brake drum 60.

The one-way brake 19 may be of any suitable well-known type, such as of the sprag type, as shown, which comprises an inner race 76 surrounding the quill shaft 15. As illustrated, the inner race 76 is formed as an axially extending portion of an annular support member 77 fixed within the housing 65 and providing a central support for the shafts 15 and 14 and the various elements supported on the shafts. A plurality of sprags 78 are disposed between the inner race 75 and an outer race 79 which is connected to the drum 58 of the brake 21 and is thereby rotatable therewith. The one-way brake 19 is utilized for completing a forward drive power train as will be described hereinafter.

In operation, the transmission provides three forward speed ratio drives and a drive in reverse. The transmission is shown in its neutral condition in Figs. 1 and 2 of the drawings with the clutches C–1 and C–2 being disengaged. It may be noted that the only manner in which torque can be transmitted from the drive shaft 10 to the shafts 14 and 15 and thereby to the planetary gear set 16 and driven shaft 17 is by means of engagement of one or the other of the clutches C–1 and C–2 and that the clutches provide parallel torque paths between the driving shaft 10 and the planetary gear set 16.

Low speed forward drive through the transmission is obtained by directing pressure fluid to the piston 40 for actuation thereof to urge the pressure plate 27 into engagement with the clutch driven plate 28. The clutch C–1 thereby functions to transmit drive from the driving shaft 10 to the shaft 14 and the sun gear 51 will rotate along with the driving shaft 10 in a clockwise direction as viewed from the left in Fig. 1. Rotation of the sun gear 51 in this direction will cause the planet gears 53 and 52 and their carrier 55 to tend to rotate in the counter-clockwise direction. However, the sprags 78 of the one-way brake device 19 are adapted to grippingly engage the inner and outer races 76 and 79 upon any attempted rotation of the outer race in a counter-clockwise direction by the carrier 55 connected thereto. Accordingly, counter-clockwise rotation of the planet gears 52 and 53 and carrier 55 is prevented, inasmuch as the outer race 78 of the brake 19 is connected to the planet carrier 55 and the inner race 75 is fixed to the stationary transmission housing 65. In this condition of the transmission, drive proceeds from the shaft 14 through the gears 51, 52, 53 and 50 to the driven shaft 17, and the shaft 17 is thus driven in a low speed forward drive speed ratio.

The transmission may be shifted from low speed forward drive to second or intermediate speed by causing engagement of the brake band 62 with the drum 60 of the brake 20, the clutch C–1 being maintained in engaged condition. As will be understood, the planet gear carrier 55 in the low speed drive is the reaction member of the gear set, and engagement of the brake 20 to hold the sun gear 54 stationary for second speed drive causes the gear 54 to become the reaction member instead of the carrier. Upon the application of the brake 20 drive will proceed from the drive shaft 10 through the clutch C–1 to the shaft 14, the gears 51, 52, 53 and 50 to the driven shaft 17 in the same manner as in low speed drive, but due to the fact that the sun gear 54 is now stationary, the driven shaft 17 is rotated at a faster speed than in low speed drive. It will be apparent that the transmission may be conditioned for second speed drive instead of low speed drive when second speed drive is desired to start the automobile by engaging the clutch C–1 and brake 20. It may be noted also that in second speed drive, the function of preventing rotation of the sun gear 54 causes the planet carrier 55 and planet gears 52 and 53 carried thereby to revolve in a clockwise direction, whereby the one-way brake 19 disengages and allows these planetating elements to revolve in this manner.

High speed forward or direct drive is obtained by disengaging the brake 20 and engaging the clutch C–2, allowing the clutch C–1 to remain engaged. Engagement of the clutches C–1 and C–2 locks the sun gears 54 and 51 together so that all of the parts of the gear set 16 rotate as a unit. With the gear set locked up, the driven shaft 17 rotates at a one-to-one drive with respect to the drive shaft 10. It will be noted that all of the parts of the planetary gear set 16 will rotate in a clockwise direction looking from the left in Fig. 1, so that the one-way brake device 19 is disengaged and overruns. In the event it is desired to tow or push the vehicle to start the vehicle engine, the clutches C–1 and C–2 are applied to complete a drive through the transmission from its driven shaft 17 to its drive shaft 10 for this purpose.

When the vehicle descends a slope in direct drive, it may be desirable to control its speed by utilizing the engine as a braking device with one of the lower speed ratios being completed through the transmission. When the transmission is in direct drive, the engine does act as a brake but its braking effect is greater for the lower speed ratios of the transmission. The drive in low speed ratio with the clutch C–1 engaged is a one-way drive the to the action of the one-way brake 19; however, the brake 21 may be engaged for holding the planet carrier still for both directions of rotation in order to allow the driven shaft 17 to drive the drive shaft 10 in this speed ratio, and the greatest engine braking effect is thus provided with the clutch C–1 and brake 21 engaged.

The transmission is conditioned for reverse drive by engaging the clutch C–2 to provide a drive between the driving shaft 10 and the quill shaft 15 and thereby the sun gear 54 and by engaging the brake 21 to prevent rotation of the carrier 55, which then becomes the reaction member of the gear set. In this reverse drive condition of the transmission, rotation of the sun gear 54 in a clockwise direction as seen from the left side of Fig. 1 will cause the ring gear 50 and the driven shaft 17 to be driven in a counter-clockwise direction or reversely to the direction of rotation of the drive shaft 10. The drive in this case is from the gear 54 through the planet gears 53 to the ring gear 50.

The control system for the transmission described thus far comprises a drive shaft pump 90 and a driven shaft pump 91. The drive shaft pump 90 comprises outer and inner rotatable members 92 and 93. The members 92 and 93 are disposed in a casing 94 which is stationary with respect to the transmission housing 65, and the inner member 93 is splined on to a sleeve 95 which rotates along with the hub 39 and thereby along with the drive shaft 10 with which the hub 39 is connected. The inner member 93 is provided with a plurality of lobes 96, and the outer member 92 is provided with a plurality of cavities 97 into which the lobes may enter. The inner and outer members are eccentrically disposed with respect to each other, and, as will be noted, there is one more cavity 97 than there are lobes 96. The shapes of the inner and outer members 92 and 93 are such that all of the lobes 96 are in contact with the inner surface of the outer member 92 and form a substantially fluid tight connection with the inner surface of the outer member. The pump 90 has an inlet conduit 98 which communicates with an inlet cavity 94a and a discharge conduit 99 which communicates with a discharge cavity 94b, and, as will be readily understood, when the inner member 93 is rotated in the direction indicated in Fig. 6, causing rotation in the same direction of the outer member 92, a suction will be created in the inlet cavity 94a and the conduit 98 tending to draw fluid into the pump and any such fluid will be discharged through the outlet cavity 94b and conduit 99. The driven shaft pump 91 is similar in construction to the drive shaft pump 90 and has its inner lobed member 93 splined to the driven shaft 17 of the transmission. The casing for the driven shaft pump 91 is formed by a forward journal member 100 and a rear plate 101. The pump 91 functions in the same manner as the pump 90 and has an intake conduit 102 and a discharge conduit 103.

The transmission casing 65 has an oil pan 104 on its bottom which provides a fluid sump or container 105 for the lubricating oil for the transmission. The conduits 98 and 102 extend downwardly from the respective pumps to have their inlet ends 98a and 102a adjacent the bottom of the sump 105. The inlet ends of the conduits 98 and 102 each is provided with an oil screen 106 which is closed on its end 106a. The oil screen is of relatively fine mesh to provide a so-called viscous restriction through which the oil taken into the pumps must pass and which will be retarded in its flow due to the frictional contact of the oil and the substantial surface area of the sides of the screen openings more or less, depending on the temperature and the resulting viscosity of the oil, for purposes to be hereinafter described. In one particular embodiment of the controls, the oil screen had openings approximately .006 inch wide and was about 80 sq. in. in area, although, as will be understood, many other opening sizes and areas of screen may be used for the purposes intended. Various other types of viscous restrictions may also be used in the inlet conduits 98 and 102 as will hereinafter appear.

The discharge conduit 99 is connected with a pressure control valve 107. The valve 107 comprises a valve piston 108 slidably disposed in a cylinder 109. The valve piston 108 is adapted to block a port 110 which connects the discharge conduit 99 with a passage 111 connected with the inlet conduit 98. A vacuum motor 112 is provided for controlling the piston 108. The motor 112 is connected by a conduit 113 with the fuel intake manifold of the vehicle engine (not shown). The motor 112 comprises a flexible diaphragm 114 which carries a rigid center portion 115 having a rod 116 fixed thereto, and a compression spring 117 is provided for acting on the central portion 115 and extends between the latter portion and the opposite side of the motor 112. As is well-known, the absolute pressure in the engine manifold varies with the torque being transmitted by the vehicle engine and the torque demand by the operator of the vehicle as evidenced by the position of the vehicle accelerator (not shown in Fig. 6). The absolute pressure in the vehicle manifold is low (that is, the vacuum is high) when the accelerator is in a closed throttle position and the output torque of the engine is low. The manifold pressure increases toward atmospheric pressure (that is, the manifold vacuum decreases) when the accelerator is depressed for causing a greater torque output by the vehicle engine. The spring 117 is thus more effective to move the plunger rod 116 against the piston 108 to close the port 110 when the engine torque output is the greatest, than when the engine torque is less, and this action of the vacuum motor 112 is effective to cause a greater fluid pressure in the pump discharge conduit 99 the greater the torque that is transmitted by the engine, as will be hereinafter described in greater detail.

The motor 112 is provided with a passage 118 which discharges into the sump 105, and this passage is connected with the upper side of the flexible diaphragm 114 and the lower end of the valve piston 108. The other side of the diaphragm 114 is adapted to be connected to atmosphere by means of a passage 119 under certain conditions, and a check valve 120 is provided in the passage for normally closing it. The check valve 120 comprises a ball 121 normally disposed on a seat 122 and acted on by a spring 123 yieldably holding the ball on its seat. The function of the check valve 120, as will be described hereinafter in greater detail, is to limit the lowest pressure or highest vacuum that can exist in the vacuum motor 112 and impressed on the lower side of the diaphragm 114 which would exist at a substantial throttle closing position of the vehicle accelerator for thereby limiting the fluid pressure in the discharge conduit 99 to a minimum value.

The discharge cavity 94b of the pump 90 also has an opening leading to an orifice 124 and the discharge conduit 99 of the pump 90 is thereby effectively connected with the orifice 124 which, in contrast to the viscous restriction to the flow of the transmission oil provided by the screen 106, provides a turbulent sudden restriction to the flow of oil. The orifice 124 is sharp edged and constitutes an opening in a thin plate 125 disposed in a hollow casing 126 that is connected with the discharge conduit 99 through the discharge cavity 94b of the pump 90. The orifice 124 is disposed so as to discharge into a passage 127 provided in the hub 39, and the passage 127 discharges oil into the stamped cover 33 and on the clutch disc 31. The disc 31 is provided with openings 31a therein so that some of the oil may also pass on the clutch disc 28. The discs 31 and 28 are provided with radial grooves 128 (see Fig. 5) in their friction surfaces through which the fluid flowing through the passage 127 may escape, and this fluid functions to cool the clutch discs. The oil discharged through the orifice 124 and flowing over the discs 31 and 28 eventually reaches the sump 105 as will be hereinafter described. The thin plate orifice 124, as will be hereinafter more fully described, functions to provide a fluid pressure in the discharge conduit 99 from the pump 90 that increases progressively with the speed of the drive shaft 10 of the transmission with which the pump 90 is drivingly connected for supplying a fluid pressure that gives a smooth engagement to a starting clutch in the transmission. Although thin plates of different thicknesses may be used, I have found in one particular embodiment of the invention that a plate of .023 inch thickness having an orifice 124 therein of .187 inch in diameter provided satisfactory results.

A plunger 129 is slidably disposed in the casing 126 and effectively opens and closes the orifice 124. The plunger is connected with a lever 130 which is pivoted on a shaft 131. The shaft 131 is connected with and is eccentrically disposed with respect to a larger shaft 132 which is rotatably disposed in a lug 133 formed on the casing 126. A helical thermostat 134, fixed at its end 135, is fixed at its opposite end to the shaft 132 so as to rotate the shaft 132 with an increase or decrease of the temperature of the thermostat. As is indicated in the drawing, the shaft 132 is rotated counter-clockwise when the temperature of the thermostat changes from hot to cold, and the shaft 132 is rotated in the opposite direction when the temperature of the thermostat changes from cold to hot. Inasmuch as the shaft 131 upon which the lever 130 is swingably disposed is eccentrically located with respect to the shaft 132, the lever and thereby the plunger 129 will be raised with a change of thermostat temperature from hot to cold as is apparent from an inspection of the drawing. This movement of the plunger 129 functions to increase the effective size of the orifice 124, and similarly when the temperature of the thermostat raises, the effective size of the orifice 124 is decreased due to the movement of the plunger 129 toward the plate 125. The thermostat 134 is so disposed within the transmission casing 65 so as to be at substantially the temperature of the oil in the sump 105, so the orifice 124 is effectively changed in size with the changes in temperature of the oil flowing through it. Since the viscosity of the oil increases with a decrease in temperature of it, this thermostat compensates for such viscosity increase to tend to maintain the fluid pressure in the pump discharge conduit 99 constant regardless of temperature changes of the oil, as will hereinafter more fully appear.

Oil pressure is supplied to the various clutches and brakes for controlling the transmission by means of valve mechanism 136. The valve mechanism comprises a valve block 137 having cylindrical cavities 138 and 139 therein. The cavity 138 has ports 140, 141, 142, 143, 144 and 145, and the cavity 139 has ports 146, 147, 148, and 149.

The ports 141 and 143 are connected with the pressure chamber 41a for the piston 41 by means of a conduit 150, and the port 145 is connected by means of a conduit 151 with the cylinder 75 for the piston 74 which functions to engage the brake 20. The port 147 is connected with the fluid pressure chamber 40a in the fluid pressure mechanism 18 for actuating the piston 40 for the clutch C–1 by means of the conduit 152, and the port 149 is connected with the cylinder 69 by means of a conduit 153 so that fluid pressure from the latter port will act on the piston 68 in the cylinder. The ports 142 and 146 are arranged to exhaust into the sump 105, and the port 144 is connected with the discharge conduit from the drive shaft pump 90 by means of a conduit 154, and is connected with the port 148 by means of a passage 155 inside the valve block 137. The lower ends 138a and 139a of the cavities 138 and 139, respectively, are disposed so as to exhaust into the sump 105.

A restriction 156 is provided in the conduit 151 for retarding the flow of fluid through this conduit to be applied to the piston 74, and an accumulator 157 is connected with the conduit 151 between the restriction 156 and piston 74. The accumulator comprises a casing 158 having a cylindrical cavity 159 therein in which a piston 160 is slidably disposed. A spring 161 acts between the piston and the lower end of the cavity 159 so as to yieldably hold the piston on the seat 162 at the upper end of the casing 158.

Valve pistons 163 and 164 are slidably disposed within the cylindrical cavities 138 and 139. The piston 163 comprises lands 165, 166 and 167 and grooves 168 and 169 between the lands. The piston 164 comprises lands 170, 171 and 172 and grooves 173 and 174 between the lands.

The pistons 163 and 164 are controlled by means of levers 175 and 176. The levers 175 and 176 are fixed on a shaft 177 so as to rotate about the center line of the shaft. The lever 175 has a number of different principal positions which are indicated in the drawing to be "reverse," "neutral," "low brake," "first," "second," "third," and "tow start," and the lever 176 has principal positions corresponding to these positions of the lever 175. The lever 176 may be located at any suitable position readily accessible to the operator of the vehicle, such as directly under the vehicle steering wheel (not shown) which is an ordinary position for transmission controlling levers in automotive vehicles. The valve pistons 163 and 164 are provided with annular channels 178 and 179 respectively, and pins 180 and 181 are fixed in the lever 175 and are disposed within the slots 178 and 179 respectively, so that swinging of the lever 175 about the center line of the shaft 177 causes corresponding movements of the pistons 163 and 164.

The lever 130 is positioned so as to be actuated by the valve piston 163. The lever 130 on its end 130a opposite its end connected with the plunger 129 is provided with a set screw 182 which is contacted by the upper end of the piston 163 when the piston is moved into its second, third or tow start positions, so that the piston 163 will cause a counter-clockwise movement of the lever 130 about the shaft 131 on which it is pivotally mounted for regulating the position of the plunger 129 for purposes which will be hereinafter described. A set screw 183 is provided in a stationary part 184 for regulating the amount of clockwise movement the lever 130 may have, and a tension spring 185 is hooked into the lever 130, between its end 130a and the shaft 131 and extends between the lever 130 and a stationary part 186 for yieldably holding the lever 130 against the set screw 183.

The port 140 in the valve block 137 is supplied with a reduced fluid pressure from a conduit 187 which is connected with a pressure reducer valve 188. The valve 188 comprises a valve piston 189 having lands 190 and 191 and a groove 192 between the lands. The piston 189 is slidably disposed in a casing 193 having cylindrical cavities 194 and 195 of different diameter. The lands 190 and 191 differ similarly in diameter with the land 190 being larger, and these lands respectively are slidably disposed within the cavities 194 and 195. The casing 193 has ports 196, 197, 198, 199 and 200. A spring 201 is disposed between the left end of the land 191 as seen in the drawing and an opposite portion of the casing 193 for yieldably moving the piston 189 to the right as seen in the drawing. The port 196 is connected with the conduit 187, and the ports 197 and 199 are connected together by means of a passage 202 in the casing 193. The port 200 is connected with the conduit 99, and the port 198 is disposed so as to discharge into the transmission sump 105.

The discharge conduit 103 of the driven shaft pump 91 is connected to the discharge conduit 99 of the drive shaft pump 90, so as to provide a driven shaft actuated supply of fluid pressure to the conduit 154 by means of which the transmission clutches and brakes may be actuated when the drive shaft pump 90 is inoperative. A conduit 203 is connected to the driven shaft discharge conduit 103 and is utilized for providing lubricating fluid to moving parts of the transmission such as requiring lubrication, bearings, et cetera. A restriction 204 is provided in the conduit 203 for limiting the fluid that may pass through the conduit 203 for lubricating purposes.

The housing 65 at its forward end is bell shaped and its portion 65a encloses the flywheel 12, the clutches C–1 and C–2 and the mechanism 18. The housing is connected to a plate 205, fixed to the vehicle engine and the portion 65a and the plate 205 define a clutch oil sump 206. The sump 206 is maintained in substantially dry condition due to the action of the flywheel 12. The transmission housing portion 65a is provided at one side thereof with an internal rib 207 and a passage 208 in communication with the rib. The rib 207 is disposed adjacent the flywheel, so that during rotation of the flywheel, its teeth will be effective to draw the oil in the sump 206 against the rib and into the passage 208. The oil will flow downwardly through the passage to its outlet end 209, and the oil will fall therefrom into the main sump 105.

In the operation of the above described transmission and its controls, shifting between the various speed ratios of the transmission is accomplished simply by shifting the levers 175 and 176 and thereby the valvese 163 and 164 between their respective positions. The valves 163 and 164 and the lever 175 are shown in their neutral positions in Fig. 7 corresponding to the neutral condition of the transmission, with drive between the drive shaft 10 and driven shaft 17 being broken. The vehicle engine driving the pump 90 is assumed to be operating, and there is fluid under pressure in the conduit 99. There is, therefore, fluid pressure in the ports 144 and 148 connected with this conduit by means of the conduit 154, and there is also, incidentally, a fluid under a lower pressure in the conduit 187, as will hereinafter be described; however, the port 144 is blocked by the land 166 and the port 140 is blocked by the land 165 so that fluid pressure in these ports has no effect. The groove 174 in the piston 164 connects the ports 148 and 149, as shown, and the effect of this connection is to apply the reverse brake 21. The brake is applied by the fluid under pressure which flows through the groove 174 from the port 148 and through the port 149 and condit 153 to the cylinder 69 and which applies the brake by means of the piston 68, lever 66 and strut 67. The engagement of the reverse brake 21 conditions the transmission for a reverse drive which may be subsequently completed by an engagement of the friction clutch C–2, and as will appear from a further description of operation of the transmission, engagement of the brake 21 in the neutral condition of the transmission assures that the friction clutch C–2 rather than the brake 21 is the friction engaging means that actually completes the reverse drive. The conduit 150 connected to the piston 41 for the rear friction clutch C–2 is connected by means of the groove 168 with the bleed passage 142, and the groove 173 in the valve piston 164 connects the conduit 152 for the piston 40 for the front friction clutch C–1 with the bleed passage 146, and thus no fluid pressure is applied to either of the clutch engaging pistons, and both of the friction clutches C–1 and C–2 are disengaged. With the valves 163 and 164 being in their Fig. 7 positions, the transmission is thus in neutral condition, regardless of the fact that the reverse friction brake 21 is engaged.

The transmission is shifted into its low or first gear ratio by shifting the lever 175 into the corresponding position by means of the lever 176, and this movement of the lever 175 causes the valves 163 and 164 to be moved into the positions in which they are shown in Fig. 8. Such shifting of the valves 163 and 164 may be done while the accelerator (not shown) of the vehicle is in any position. The valve 163 in its Fig. 8 position blocks both of the pressure ports 140 and 144, as before. The valve piston 164 in its Fig. 8 position connects the port 147 with the port 148 by means of its groove 174 so as to connect the fluid discharge conduit 99 of the drive shaft pump 90 with the piston chamber 40a for the front friction clutch C–1 by means of the conduits 154 and 152. The ports 149 connected with the conduit 153 for the reverse brake piston 68 drains through the lower end 139a of the cylindrical cavity 139 so that the reverse brake 21 is disengaged.

The function of the thin plate orifice 124 is to provide a fluid pressure in the discharge conduit 99 of the drive shaft pump 90 that increases with the output of the pump 90 and thereby with the speed of the drive shaft 10. The orifice 124 may be considered as a turbulent type orifice, that is, one through which the flow of fluid is not smooth but is turbulent and has a multitude of eddies. This turbulence in fluid flow I consider to be attained due to the fact that the orifice is sharp edged and is formed in a thin plate and is of substantially uniform diameter. As has been described, the conduit 99, when the valves 163 and 164 are in their first gear positions, is connected with the piston 40 for the forward friction clutch C–1, and this fluid pressure that increases with drive shaft speed is thereby applied to engage this clutch. The engagement that is given the clutch C–1 thus varies in intensity according to the speed of the vehicle engine, so that the net result is a smooth completion of the first speed power train through the transmission. As has been described, the orifice 124 discharges to the sump 105, the discharge being through the passage 127 on to the clutch discs 28 and 31. The disc 28 is thereby cooled as the clutch C–1 slips in providing this gradual completion of the first speed power train.

During this engagement of the clutch C–1, the pressure control valve 107 substantially closes the port 110 through which fluid from the discharge conduit 99 is relieved under certain conditions to flow through the passage 111 back into the pump inlet conduit 98. The pressure control valve 107 is so arranged to allow the pressure in the conduit 99 to increase sufficiently so that the clutch C–1 is completely engaged without slippage before the control valve 107 functions to further limit the increase in fluid pressure in the conduit 99. When the fluid in the conduit 99 has increased sufficiently so that the clutch C–1 is completely engaged, then the piston 108 moves downwardly as seen in Fig. 6 to open the port 110 and allow part of the discharge of the pump 90 to flow back into the inlet conduit 98, and the action of the piston 108 is a regulating action, that is, the piston 108 moves in this direction only sufficiently so as to maintain a predetermined pressure within the conduit 99. This predetermined pressure varies with the torque output of the vehicle engine and with the torque demand by the vehicle operator as evidenced by the position in which he puts the vehicle accelerator utilizing the vacuum motor 112 connected with the fuel intake manifold of the vehicle engine for this regulating action.

As is well known, the pressure existing in the fuel intake manifold of an ordinary automobile internal combustion engine varies with the engine output torque, the torque demand and position of the vehicle accelerator, and the pressure in the manifold is exerted on the diaphragm 114 of the vacuum motor 112. As the engine output torque and the torque demand and corresponding accelerator depression become greater, the absolute manifold pressure increases (or the manifold suction decreases) and tends to allow the central portion 116 of the diaphragm to move upwardly as seen in Fig. 6 due to the action of the spring 117. The valve piston 108 has three forces acting on it, namely, the force due to the pressure in the conduit 99 on its upper end and the force from the pin 116 on its lower end which is the algebraic sum of the force from the spring 117 and the force due to the manifold pressure which is a suction acting on the lower side of the diaphragm 114. These forces balance each other to regulate the fluid pressure in the conduit 99. As the absolute manifold pressure increases, the spring 117 is of greater effectiveness and holds the piston 108 in a position closing the port 110 until a greater pressure is attained in conduit 99, and the regulated pressure in the conduit 99 is greater. The action of the valve 107 is opposite for decreases in torque demand. The regulating valve 107 thus functions to provide a greater regulated fluid pressure in the conduit 99 when the torque demand is greatest and a less fluid pressure in the conduit 99 when the torque demand is less. Thus it will be clear that the turbulent orifice 124 causes an increase in fluid pressure within the conduit 99 which varies with the increase in drive shaft speed until the pressure is reached which the regulating valve 107 is effective to maintain, and the latter pressure varies, as has been explained, with the engine torque output the torque demand by the operator of the vehicle, and the position of the accelerator. The turbulent orifice 124 thus functions to smoothly engage the clutch C–1, and the regulating valve 107 functions to increase the engaging pressure of the clutch C–1 with an increase of torque output of the engine.

The minimum pressure (or greatest vacuum) that may act on the diaphragm 114 is determined by the vacuum limit valve 120, the ball of which moves off its seat 122 when the pressure within the motor 112 tends to decrease below the predetermined value.

Figure 13:
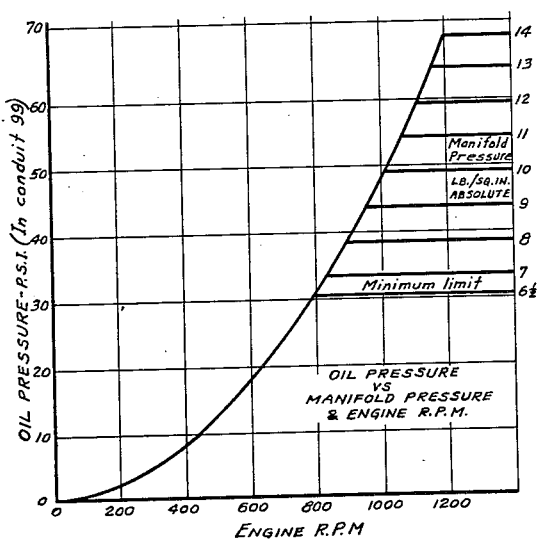
Fig. 13 is a graph showing the variation of the output fluid pressure of the drive shaft pump with changing engine speed and engine manifold pressure.

For illustration of the manner in which the engine pump output pressure in conduit 99 varies with the engine speed and manifold pressure, the graph of Fig. 13 may be referred to. The pump output pressure will be seen to vary, as has just been described. The particular valves given for the pump pressure are for a particular installation and may vary for other installations as will be understood. The particular valves set forth are just by way of example.

The turbulent orifice 124 is effective, as has been described, to provide a fluid pressure in the pump discharge conduit 99 that increases with drive shaft speed; however, as is well known, the viscosity of oil varies considerably with temperature. If no mechanisms for compensating for temperature changes were provided, the fluid pressure in the discharge conduit 99 would still vary in accordance with drive shaft speed due to the turbulent orifice 124, but the pressure would increase faster with lower oil temperatures than with higher oil temperatures and the engagement of the starting friction clutch C-1 would thus vary with temperature. I provide two mechanisms for compensating for temperature variations, and these are the thermostat 134 and the viscous restriction in the intake conduit 98 of the pump 90 which in the Fig. 6 embodiment is in the form of a fine mesh screen 106.

The thermostat 134 is within the transmission casing 65 as is the rest of the control mechanism shown in Fig. 6, and the thermostat is located so that it has oil splashed on to it, such as from the channel 208, and the thermostat is thus substantially at the temperature of the oil within the sump 105. As would be expected, the greater the viscosity and the thicker the oil with decreased temperature, the greater would be the force required to cause it to flow through the turbulent orifice 124 and the higher would be the fluid pressure in the conduit 99. The thermostat 134 is thus arranged so that as the oil temperature decreases, the plunger 129 is moved upwardly as seen in Fig. 6 away from the plate 125 to increase the effective size of the orifice 124, and as the oil temperature increases, the plunger 129 moves downwardly to decrease the effective size of the orifice 124. The thermostat functions in this manner by rotating the shafts 131 and 132 counterclockwise as seen in Fig. 6 with a decrease in temperature and in the opposite direction with an increase in temperature. The shaft 132 rotates in the fixed part 133 so that the eccentrically located shaft 131 raises and lowers the left end of the lever 130 and the plunger 129. In the first gear position of the valve 163 shown in Fig. 8, it will be noted that it is out of contact with the set screw 182 in the right end of the lever 130, and the lever thus rests on the fixed set screw 183. With changes in temperature, the lever 130 pivots about the set screw 183.

The viscous restriction in the intake conduit 98 in the form of the fine mesh screen 106 functions to increase the resistance to flow into the conduit 98 with increased viscosity of the oil due to decreased temperature. The screen 106 in effect provides in the path of oil flow into the intake conduit 98 numerous friction surfaces which aggregate a substantial area over which the oil must flow, and the friction to the flow of oil, as will be readily understood, is greater, the greater the viscosity of the oil. The effect of the screen 106 is thus to reduce the flow of oil to the pump 90 at low temperatures and tend to compensate for the increased resistance to the flow of oil through the turbulent orifice 124.

In connection with the variations of oil viscosity with temperature, it may be noted at this point that the thin sharp edged type orifice 124 formed in a thin plate 125 creates a turbulent flow of oil and is relatively less affected by viscosity changes than an orifice formed out of a thicker plate and interposing substantial surface area over which the fluid flows. The thin sharp edged type orifice 124 and the viscous orifice consisting of the screen 106 substantially compensate for each other for changes in temperature below a certain temperature, such as 70° Fahrenheit in one particular case, so that the increase in fluid pressure in the discharge conduit 99 remains the same for increases in drive shaft speed. Above this particular temperature, which was 70° Fahrenheit in the particular case noted, the thermostat 134 is effective to change the effective area of the orifice 124 so that changes in oil temperature will not substantially change the oil pressure in the pump output conduit 99. It may be noted at this point, however, that the thermostat 134 is not effective to change the effective area of the orifice 124 substantially during any particular engagement of the vehicle starting clutch C-1, and the thermostat is relatively slow acting. The area of the orifice 124 for any particular engagement of the clutch C-1 is thus substantially fixed and non-changing.

In connection with the viscous restriction formed by the screen 106, it may be noted that a number of different types of viscous restrictions may be used in lieu of the screen 106, the principal requisite for such restrictions being the provision of a substantial surface area for laminar fluid flow thereover without substantial fluid turbulence or excessive velocities which, as is apparent, is affected substantially by oil viscosity. In connection with modifications of the invention to be hereinafter described, other viscous restrictions will be described; however, briefly, the following different types of viscous restrictions may be utilized in lieu of the screen 106: A streamlined body or Venturi in a relatively large area pipe or more ideally a series of plates aligned parallel to the flow of oil in the fluid conduit.

The transmission is shifted into second or intermediate speed ratio by moving the lever 175 into the corresponding position by means of the lever 176 and by thereby moving the valves 163 and 164 into corresponding positions. The intermediate speed positions of these parts are shown in Fig. 6. The conduit 152 is connected with the passage 155 and thereby with the conduits 154 and 99 by means of the groove 174 and the ports 148 and 147 as in the low speed position of the valve 164. Clutch C-1 thus remains engaged. In shifting the valve 163 from its first speed to its second speed position, it has been moved so that its groove 169 connects the conduit 151 with the conduit 154 by means of the ports 144 and 145, so as to apply the fluid pressure within the pump discharge conduit 99 to the piston 74 for the second speed friction brake 20 for engaging the brake. The application of fluid pressure to the piston 74 is made gradually, and a corresponding gradual engagement of the brake 20 is obtained due to the use of the restriction 156 in the conduit 151 and the fluid accumulator 157 connected with the conduit 151. The restriction 156 functions to retard the flow of fluid through the conduit 151 as is apparent, and the accumulator functions to receive a portion of the fluid flowing through the restriction, so that all of it is not impressed on the piston 74. As fluid flows through the restriction 156, a portion of it flows into the accumulator casing 158 and moves the piston 160 downwardly as seen in Fig. 6 against the action of the spring 161, and as the fluid impressed on the piston 74 increases in pressure, it moves the piston 160 farther and farther into the casing 158 against the action of the spring 161 so that a progressively greater amount of fluid is received into the accumulator.

This engagement of the brake 20 completes the second speed drive through the transmission, and the brake causes the sun gear 54 to function as the reaction member of the planetary gear set 16 in lieu of the planet gear carrier 55. The one-way brake 19 for the planet gear carrier now overruns. The shaft 14 and the sun gear 51 are driven as in low speed drive through the clutch C-1 which remains engaged.

As will be noted from Fig. 6, the lever 130 has been rotated to a small extent on its shaft 131 in the counterclockwise direction off the stop 183 against the action of the spring 185 by the valve piston 163. The plunger 129 has thus been moved downwardly to a corresponding extent to slightly decrease the effective size of the orifice 124, and this decrease in orifice size has the effect of retarding the flow of fluid through the orifice, so that there is not as much oil passing therethrough as formerly after engagement of the clutch C–1 for a start in low speed drive. As has been explained, once a fluid pressure has been obtained in the conduit 99 sufficient for holding the clutch C–1 completely engaged, the pressure control valve 107 is then solely effective for regulating the pressure in the conduit 99 according to engine torque, so the decreased discharge through the orifice 124 has substantially no effect on the pressure in the conduit 99, and this will be true also in third speed drive in which the effective size of the orifice 124 is further decreased, as will be described.

The transmission is shifted into its third speed ratio by moving the lever 175 into the corresponding position by means of the manual control lever 176. The valves 163 and 164 are moved by this movement of the lever 175 into their Fig. 9 positions. The valve 164 in its Fig. 9 position, as will be noted, connects the ports 148 and 147 by means of its groove 174, as in its second speed ratio position, to maintain the forward friction clutch C–1 engaged. The valve 163 in its Fig. 9 position connects the ports 141 and 140 by means of its groove 168 so as to connect the conduits 187 and 150 for applying the rear friction clutch C–2. The conduit 187 carries a fluid pressure which is at some predetermined less value than that in the conduit 99, this fluid pressure being utilized for engaging the clutch C–2 for purposes which will hereinafter be described in greater detail. The pressure reducer valve 188 functions to provide this reduced fluid pressure within the conduit 187.

The pressure in the conduit 99 and the spring 201 are both effective on the end 191a of the land 191 and tend to move the piston 189 to the right as seen in Fig. 6. Fluid is thereby admitted into the conduit 187 through the ports 200 and 199, passage 202 and ports 197 and 196. Fluid continues to flow in this manner into the conduit 187 until the pressure therein which is impressed on the land end 190a is sufficient to move the piston 189 back toward the left as seen in Fig. 6 so that its land 191 closes the port 200. The land 190 is of substantially greater diameter than the land 191 as will be noted, and the effect of the fluid pressure in the conduit 187 impressed on this land is such as to balance out the effect of the pressure in the conduit 99 impressed on the land 191 and the spring 201 at a fluid pressure in the conduit 187 at the predetermined less value than the pressure in the conduit 99. Since the fluid pressure in the conduit 99 is variable with engine torque due to the action of the manifold motor 112 and since this variable fluid pressure is impressed on the left end of the valve 189, the pressure in the conduit 187 is also variable with the engine torque but the valve 188 maintains the pressure in the conduit at a predetermined less value than the pressure in the conduit 99.

In the third speed position of the piston 163 shown in Fig. 9, the groove 168 connects the ports 140 and 141, and the reduced fluid pressure in the conduit 187 is thus applied to the clutch piston 41 through the conduit 150. Upon the valve 163 being moved into its third speed position, the rear friction clutch C–2 is thus engaged, and the engagement varies with the engine torque as will be apparent, so that the completion of the third speed power train is with a minimum of shock. The reduced fluid pressure in the conduit 187 is utilized for engaging the clutch C–2 for shifting into third speed, instead of the full line pressure in the conduit 99, for reasons which will hereinafter be stated. Since both the clutches C–1 and C–2 are engaged, the transmission is now in third speed drive. In this shifting of the valve piston 163, it will be noted that the conduit 151 has been vented by the valve 163 through the open lower end 138a of the cavity 138, and the second speed brake 20 is thus disengaged. This movement of the valve 163 into its third speed position has the effect of further closing the orifice 124 by means of the plunger 129 and lever 130; however, this has substantially no effect on the fluid pressure in the conduits 99 and 187 since, as has been explained, the pressure control valve 107 is at this time solely effective for regulating the pressure in the conduit 99.

The orifice 124 is effectively reduced in size in third speed ratio position of the lever 175 and valves 163 and 164, so that in this speed ratio the opening is very nearly closed to limit the slipping of the clutches C–1 and C–2 at low speeds of the vehicle. The orifice 124 is left open slightly in direct drive to permit the vehicle to be stopped in this speed ratio without stalling the engine. It is contemplated that stall speeds of about 1250 R. P. M., 1000 R. P. M. and 750 R. P. M. in first, second and third gears respectively may be used to permit starting in any forward speed ratio without abusing the clutch C–1, although, as has been described, the normal shifting sequence is 1st to 2nd to 3rd speed ratios. The effective size of the orifice 124 is also preferably controlled in second speed ratio in addition to third speed ratio to give control over the stall speed in second speed ratio in the same manner as in third speed ratio.

The transmission is shifted into reverse drive by moving the lever 175 to the corresponding position by means of the manually controlled lever 176. The valves 163 and 164 will thus be moved into their "reverse" positions in which they are shown in Fig. 10. The valve 164 in this position connects the ports 148 and 149 by means of its groove 174 and thereby engages the reverse brake 21 by fluid which flows through the conduit 153 connected with the reverse brake piston 68. The reverse brake 21 thus remains engaged as it was in the neutral positions of the valves 163 and 164. The valve 163 in its Fig. 10 reverse drive position connects the ports 143 and 144 by means of the groove 168. The port 144 is connected with the pump discharge conduit 99, and the conduit 150 connected with the piston 41 for clutch C–2 is thus connected with the pump discharge conduit 99. It is assumed that when the valves 163 and 164 are moved into their Fig. 10 reverse drive positions, the accelerator of the vehicle is in its engine idling position, and in this case when the connection to the piston 41 for clutch C–2 is made, the retraction springs 36 for the clutch are of sufficient strength to maintain the clutch C–2 disengaged. The retraction spring 70 for the reverse band, on the other hand, is relatively weak, and the brake 21 is engaged by the fluid pressure in the pump discharge conduit 99 under engine idling conditions. The pressure in the discharge conduit 99 now applied to the piston 41 for the clutch C–2 increases with engine speed in the same manner as when the vehicle is started in first speed forward drive, and the clutch C–2 is engaged according to engine speed in the same manner to give a gradual and smooth start to the vehicle in reverse drive. After the engine speed has reached a certain value, the pressure control valve 107 is thereafter effective to regulate the pressure in the pump discharge conduit 99 according to engine torque in the same manner as in low speed drive, and the clutch C–2 is maintained engaged with a clutch engaging pressure that varies according to engine torque, so that slipping of the engaging parts of the clutch does not occur thereafter.

As has been described, the clutch C–2, together with the clutch C–1, is engaged for a forward direct drive through the transmission, and the clutches are so connected with the gear set 16 that the rear clutch C–2 transmits somewhat less than one-half the drive torque of the engine, for example, approximately one-third engine torque in a certain embodiment of the invention.

In reverse drive, on the other hand, the clutch C–2, exclusive of the clutch C–1, is engaged for completing the reverse drive, and it carries full engine torque. It is thus apparent that in order to obtain smooth engagement of the clutch C–2 for both drives, a smaller engaging pressure should be applied to the engaging parts of the clutch C–2 for direct drive than for reverse drive, and this is the purpose of the pressure reducer valve mechanism 188. As has been described, the reduced pressure in the conduit 187 is applied to the piston 41 for the clutch C–2 for engaging the clutch for direct drive while the full fluid pressure in the pump discharge conduit 99 is applied to this piston for engaging the clutch for the reverse drive.

The transmission may be conditioned for low gear braking, in which both the clutch C–1 and the brake 21 are engaged, by moving the lever 175 into the corresponding position indicated in Fig. 6 by means of the manual lever 176. The valves 163 and 164 are moved correspondingly as shown in Fig. 11, and the valve 163 in its Fig. 11 position connects the ports 142 and 143 for venting the pressure chamber 41a for the clutch C–2 as for neutral condition of the transmission. The valve 164 in its Fig. 11 position connects the ports 148, 147 and 149 so that the fluid pressure in the pump discharge conduit 99 is supplied to both the conduit 153 for the reverse brake 21 and also to the conduit 152 for the forward clutch C–1. The reverse brake thus remains engaged as in the neutral condition of the controls shown in Fig. 7, and the forward clutch C–1 is engaged upon the vehicle engine attaining a sufficiently high speed. In this condition of the transmission, the reverse brake 21 functions to prevent overrunning of the one-way brake 19, and there is a two-way drive between the shafts 10 and 17 which, as has been described, is useful in preventing an excessive speed of the vehicle in descending hills, for example.

Figure 12:
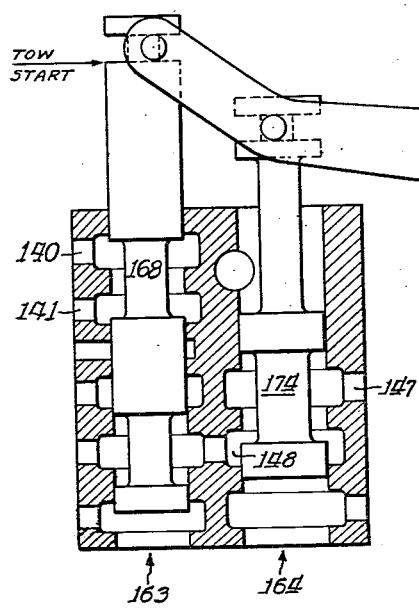

The pump 91 driven by the driven shaft 17 of the vehicle has substantially no function for ordinary drives through the transmission in the Fig. 6 embodiment of the invention. Its discharge conduit 103 is connected with the conduits 99 and 154 and the pump causes a greater amount of fluid flow through the pressure regulator valve 107 when the vehicle is in motion; however, it does not substantially change the pressure existing in the conduit 99 and connected conduits. When it is desired to start the vehicle engine, however, by pushing or towing the vehicle, as when the starter mechanism for rotating the flywheel 12 by electric power is inoperative, the pump 91 on movement of the vehicle will supply sufficient fluid pressure to the conduit 99 and connected conduits for engaging the two clutches C–1 and C–2 to complete the direct drive power train through the transmission. In order to complete the power train in this manner, the lever 175 is moved to its tow start position, as indicated in Fig. 6, by means of the manually controlled lever 176. The valves 163 and 164 are thus moved into their Fig. 12 positions. The valve 164 in its Fig. 12 position connects the ports 148 and 147 by means of its groove 174, and the piston 40 for the clutch C–1 is thus connected with the conduits 154 and 103. The valve piston 163 by means of its groove 168 connects the ports 140 and 151, and the piston 41 for the clutch C–2 is connected with the conduit 103 through the pressure reducer valve mechanism 188 and the conduit 187. When the vehicle is moved by pushing or towing, the pump 91 supplies fluid under pressure to its discharge conduit 103, and this fluid is transmitted to the clutch engaging pistons 40 and 41 through the conduits just mentioned, and the clutches are engaged to complete the drive through the transmission for starting the vehicle engine.

A noteworthy feature of the tow starting connections just described lies in the function of the plunger 129 of completely closing the orifice 124 when the lever 175 and the valves 163 and 164 are moved into their tow starting positions, at least when the transmission oil is heated to its normal operating temperature. The valve piston 163 through the set screw 182 functions to rotate the lever 130 about its pivot shaft 131 so as to move the plunger 129 in orifice closing direction. There is thus little or no loss of fluid pressure due to the orifice 124 for tow starting the vehicle engine, and the pressure control valve mechanism 107 is substantially solely effective for limiting the fluid pressure in the conduit 99 and connected conduits for this condition of the valve mechanism 136.

As has been described, the conduit 203 is connected with various moving parts in the transmission, and fluid from the conduits 99 and 103 is supplied through the conduit 203 after passing through the restriction 204 for lubricating these parts. The restriction 204 limits the fluid that passes through the conduit 203 for lubricating purposes.

The embodiment of the transmission controls shown in Fig. 14 includes many of the constructions and features found in the controls illustrated in Figs. 6 to 12. The Fig. 14 embodiment includes the same drive shaft pump 90 having the fluid in its discharge conduit 99 controlled by the thin sharp edged orifice 124 and a manifold vacuum controlled valve 107. A viscous restriction in the pump intake conduit 98 is also utilized for controlling the pressure in the conduit 99; however, the viscous restriction is of a somewhat different type for accomplishing substantially the same result. The modified viscous restriction includes a streamlined body 220 in the conduit 98 which functions like the screen 106 in the first embodiment of the controls to provide a large surface over which the fluid passing through the conduit 98 must flow and which frictionally retards the fluid flow, particularly at low temperatures and high viscosities of the oil.

The same valve mechanism 136 is utilized in the Fig. 14 embodiment and includes the same valves 163 and 164. The same valve controlled lever 130 is utilized for controlling the position of the plunger 129 and the same thermostat 134 is utilized. The lever 175 is controlled as in the former embodiment by means of the selector 176 within reach of the vehicle operator. The same driven shaft pump 91 is utilized, discharging into the conduit 103 which is connected by means of the conduit 203 with various parts to be lubricated in the transmission. The conduit 102 includes a modified viscous resriction which is equivalent to the screen 106 used in the Fig. 6 embodiment of the controls, and the modified restriction includes a streamlined body 220 similar to that in the conduit 98.

One of the principal differences between the Fig. 14 and Fig. 6 control arrangements lies in the provision in the former of automatic mechanism for shifting responsive to the driven shaft speed and engine output torque between first and second forward drive ratios. This shift is obtained by means of a shift valve 221 which is connected in the conduit 151 leading to the piston 74 for the second speed brake 20. The valve 221 comprises a valve piston 222 slidably disposed in concentric cavities 223, 224 and 225 formed within a valve casing 226. The valve piston 222 comprises lands 227, 228, 229, 230 and 231 with grooves 222a and 222b disposed between the lands 228, 229 and 230. The lands 228, 229 and 230 are of the same diameter, and the lands 227 and 231 are respectively of smaller and larger diameters, as shown. The lands 227 and 231 are slidably disposed in the cavities 223 and 225, respectively, and the other lands are slidably disposed in the cavity 224. The valve casing 226 comprises ports 232, 233, 234, 235, 236, 237, 238, 239 and 240. The ports 237 and 238 are respectively connected with the incoming and outgoing sides 151a and 151b of the conduit 151. The port 240 is connected with the discharge conduit 103 of the vehicle driven pump 91, and the port 232 is connected by a conduit 241 with the discharge conduit 99 of the engine pump 90. The ports 236 and 239 are connected to discharge freely into the oil sump 105. The ports 234 and 232 are connected by means of a passage 242 formed within the casing 226. The ports 233 and 235 are connected by means of a conduit 243 with a downshift plunger mechanism 244. A spring 245 is provided between the end of the cavity 223 and the valve piston 222, being disposed in an internal cavity 246 in the land 227.

The plunger mechanism 244 comprises a plunger 247 slidably disposed in a casing 248. A compression spring 249 is disposed between the plunger and the bottom of the casing 248 tending to move the plunger upwardly in the casing. A stop 250 is provided for limiting the upward movement of the plunger. The plunger is adapted to act on an extension 251 of the lever 175, and the arrangement is such that when fluid under pressure is supplied to the conduit 243 and thereby within the casing 248, the combined action of the spring and the fluid under pressure is sufficient to move the plunger 247 upwardly into contact with the stop 250 and thereby move the levers 175 and 176 from their third speed positions to their second speed positions, assuming that the levers have been previously moved into their high speed positions. It is contemplated that the spring 249 shall not be sufficient in itself to cause this movement of the levers 175 and 176 due to the friction between the various parts connected with the levers or to the use of any suitable detent mechanism (not shown) for the levers which may be provided if desired.

In this embodiment of the invention a thin plate orifice 252, similar to the orifice 124 is provided in connection with the discharge conduit 103 for the pump 91. The orifice 252 is formed in a thin plate 253, and a plunger 254 similar to the plunger 129 is provided for varying the effective size of the orifice 252. A thermostat 255 similar to the thermostat 134 is provided for effectively moving the plunger 254 toward and away from the thin plate 253 in the same manner as the plunger 129 is moved toward and away from the thin plate 125 by the thermostat 134. Discharge openings 256 in communication with the oil sump 105 are provided in connection with the orifice 252. The thermostat 255, like the thermostat 134, is in any suitable way in communication with the oil in the sump 105 so as to be at substantially the same temperature as the oil and functions to move the plunger 254 farther away from the orifice 252 to increase its effective size when the oil becomes cold. A check valve 257 is provided in a branch 103a of the conduit 103 connecting the conduits 103 and 99. The check valve comprises a ball 258 adapted to rest on a seat 259 and acted on by a spring 260 tending to hold it on its seat.

Figure 15:
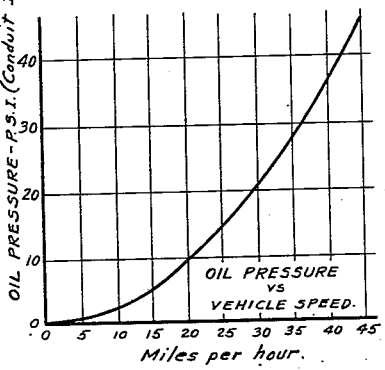
Fig. 15 is a graph showing the variation of the output fluid pressure of the driven shaft pump with changing vehicle speed.

During the operation of the embodiment of the controls shown in Fig. 14, the vehicle driven pump 91 in conjunction with the viscous restriction 220 in the conduit 102 and with the thermostatically regulated thin plate orifice 252 in communication with the discharge conduit 103 of the pump provide a fluid pressure within the conduit 103 that increases with the speed of the driven shaft 17 and thereby in accordance with the speed of the automotive vehicle in which the transmission is installed. The fluid pressure increases in this manner until it becomes high enough so that the check valve 257 opens, and thereafter the fluid pressure in the conduit 103 is the same as that in the conduit 99 which varies with the engine torque after the vehicle has been started. Due to the use of the viscous restriction 220 in the conduit 102 and the thin plate orifice compensated by means of the thermostat 255, the fluid pressure in the conduit 103 varies, prior to the opening of the check valve 257, substantially the same with change in vehicle speed and driven shaft speed for all the different operating temperatures of the oil in the sump 105, and these parts operate to produce this result in the same manner as do the corresponding viscous restriction, thin plate orifice and thermostat used in conjunction with the drive shaft pump 90, which produce the clutch engaging fluid pressure in the conduit 99 that increases with the drive shaft speed uniformly for all operating oil temperatures. The fluid pressure in the conduit 103 for one particular embodiment of the invention varies in accordance with the curve shown in Fig. 15. As this curve indicates, a maximum fluid pressure of 45 lbs. per sq. in. in the conduit 103 is reached at the vehicle speed of 45 miles per hour, and at this point the check valve 257 opens, and the pressure at higher speeds of the vehicle which are not indicated in the graph, varies in the same manner and along with the pressure in the conduit 99. It will be noted that the shape of the curve shown in Fig. 15 is substantially the same as that in Fig. 13 prior to the time the pressure control valve 107 becomes effective to limit the pressure. Both of these curves, incidentally, are substantial $Y=X^2$ curves where the ordinate Y is the oil pressure and the abscissa X varies with the speed of the respective pump.

For ordinary operation in the forward drive, the lever 175 is put into its second speed position by means of the manually controlled lever 176. For starting conditions of the vehicle, the valve piston 222 is in its illustrated position in which the conduit 151 is blocked by the land 229 of the valve, and thus fluid pressure from the conduit 154 is applied to only the piston 40 for the clutch C–1 for starting the vehicle in low speed forward drive. The clutch C–1 is engaged in accordance with the speed of the drive shaft 10 in the same manner as with the controls shown in Figs. 6 to 12.

The pressure in the conduit 103 which varies in accordance with vehicle speed is impressed on the face 231a of the land 231 and tends to move the valve piston 222 to the left as seen in Fig. 14. The spring 245 acts on the other end of the valve piston 222 and functions to yieldably hold it in its illustrated position. The fluid pressure in the conduit 241 is effective on the left end of the valve piston 222 tending to hold it in its illustrated position, and this fluid pressure is also effective on the face 228a of the land 228 augmenting the action of the fluid pressure and the action of the spring 245 on the left end of the valve piston 222. As has been explained, the pressure in the discharge conduit 99 of the pump 90 and thereby the pressure in the conduit 241 connected therewith varies after the initial completion of the first speed power train in accordance with the engine torque, due to the action of the pressure control valve 107. Thus the forces impressed on the piston 222 and tending to shift it are the fluid pressure variable with engine torque impressed on the left end of the piston and on the land face 228a and the force due to the spring 245 all tending to move the piston 222 to the right as seen in Fig. 14 and the force due to the fluid pressure in the conduit 103 variable with vehicle speed exerted on the right end of the piston 222 tending to move it to the left.

When the vehicle speed increases sufficiently so that the pressure in the conduit 103 becomes great enough, this fluid moves the valve piston 222 to the left against the action of the engine torque variable fluid pressure in the conduit 241 and the spring 245. This shifting of the piston 222 functions to engage the brake 20 for shifting the transmission into second speed drive, as will be described. It will be understood that the valve piston 222 is shifted at different speeds of the vehicle in accordance with the torque output of the vehicle engine. When the engine torque is greater, the fluid pressure in the conduit 241 is greater and the shift into the higher speed ratio does not occur until a higher speed of the vehicle is attained. Thus, the transmission remains longer in a lower speed ratio in accordance with greater engine torque and torque demand by the vehicle operator. Conversely, when the engine torque and torque demand are less, the transmission is shifted into second speed ratio at a lower vehicle speed.

When the valve piston 222 is shifted to the left, the groove 222b connects the ports 237 and 238, and fluid under pressure then flows through the conduit 151b and through the restriction 156 into the casing 75 for actuating the piston 74 to engage the brake 20. Engagement of the brake 20 is cushioned as in the Fig. 6 embodiment of the controls by means of the accumulator 157. The transmission is then in second or intermediate speed drive.

A subsequent upshift into third speed forward drive is attained by manually moving the lever 175 into its third speed position by means of the control lever 176. The valves 163 and 164 function in their third speed positions to engage both the clutches C-1 and C-2 for completing the third speed power train in the same manner as in the Fig. 6 embodiment.

The valve 222 in conjunction with the downshift plunger mechanism 244 function to downshift the transmission from third speed forward drive to low speed forward drive when the speed of the vehicle decreases below a predetermined speed which varies with the torque exerted by the engine. A decrease in vehicle speed causes a corresponding decrease in fluid pressure in the discharge conduit 103 for the vehicle driven pump 91, and when the decrease is sufficient so that the force on the left end of the piston 222 due to engine torque regulated fluid pressure in the conduit 241 and the spring 245 becomes relatively greater than the force due to the pressure in the conduit 103, the valve 222 moves back into its position in which it is illustrated in Fig. 14. In this position, pressure from the conduit 99 is applied to the plunger 247, the connection between the plunger and conduit 99 being through the conduit 241, the passage 242, the ports 234 and 233 and the conduit 243. The force on the plunger 247 due to the spring 249 and the fluid pressure in the conduit 243 is sufficient to move the lever 175 and thereby also the lever 176 back into their second speed positions in which they are illustrated in Fig. 14. With the valves 163 and 164 in their second speed positions, as illustrated in Fig. 14, the clutch C-1 is engaged and the clutch C-2 is disengaged as previously described. The land 229 of the valve piston 222 in the illustrated position of the piston blocks the conduit 151, and the brake 20 is thereby disengaged, the pressure piston 74 for the brake being drained to the sump 105 through the conduit portion 151b and the ports 238 and 239. When the clutch C-1 is engaged and the clutch C-2 and brakes 20 and 21 are disengaged the transmission operates in first speed ratio. The transmission is thus shifted back into first speed ratio, since the control lever 175 is in its second speed ratio position thereby causing clutch C-1 to remain engaged and the valve piston 222 is in its illustrated first speed position thereby causing disengagement of the brake 20.

The valve piston 222 is so constructed that the pressure in the conduits 99 and 241 exerts a greater force on the piston tending to hold it in its illustrated position than the force exerted on it when the piston 222 is moved to the left to engage the brake 20. This is due to the land face 228a which has fluid pressure impressed on it through the passage 242 in the illustrated position of the valve piston but which does not have pressure impressed on it in the other position of the valve piston due to the fact that the land 228 blocks the port 234. In the latter position of the piston, the conduit 243 is drained through the ports 235 and 236. Assuming the same pressure in the conduits 99 and 241, the valve piston 222 will thus shift to the left into its position to engage the brake 20 at a slightly higher vehicle speed than the speed at which the valve piston shifts in the opposite direction, and hunting of the piston 222 is thus avoided.

As has been described, the check valve 257 opens when the fluid pressure in the conduit increases beyond a predetermined value, and this is beyond that necessary for shifting the valve piston 222 to the left into its second speed ratio position. After this pressure is exceeded, the ball 258 moves off its seat 259 to open the check valve 257, and the pressure in the conduit 103 is then maintained equal with that in the conduit 99, and the excessive fluid discharged by the pump 91 flows through the conduits 103a and 99 and is drained past the regulator valve 107. As has been explained, the quantity of oil passed by the pressure control valve 107 has substantially no effect on the pressure in the conduit 99, so this excess fluid discharged by the pump 91 causes no substantial change in the pressure in the conduit 99.

The principal difference between the controls shown in Fig. 16 as compared with those shown in Fig. 14 lies in the use of an electric solenoid in lieu of the downshift plunger mechanism 244 for downshifting the transmission on a decrease of vehicle speed to a predetermined value and the use of electrically operated, accelerator controlled, downshifting mechanism for downshifting the transmission when the accelerator is moved to an open throttle kickdown position.

The pumps 90 and 91, the pressure control valve 107, the pressure reducer valve 188, the valve mechanism 136, the thermostat 134 and the valve mechanism 221 are all substantially the same and are connected together in the same manner as in the prior embodiments. A different type viscous restriction 270 is utilized in lieu of the screen 106 and the streamlined body 220 in the conduit 98. The restriction 270 comprises a plurality of plates 271 which are positioned quite closely adjacent each other in the conduit and in the direction of flow of oil through the conduit. These plates, like the screen 106 and the streamlined body 220, produces laminar flow over a substantial surface area and provides substantially the same effect as the screen 106 and streamlined body 220. A similar viscous restriction utilizing a screen 106 is provided in the intake conduit 102 for the pump 91.

A different type of thermostat 273 is utilized in the Fig. 16 embodiment in lieu of the thermostat 255 in the Fig. 14 embodiment. The thermostat 273 comprises a bimetallic strip having a layer 274 of a metal having a certain coefficient of expansion and a layer 275 of a metal having a lower coefficient of expansion. The strip is fastened in place by means of a screw 276 and has a pointed valve element 277 extending through a thin plate orifice 278 formed in the sheet metal of the conduit 103. The bimetallic strip functions with colder temperatures to withdraw the valve element 277 out of the orifice 278 so as to increase the effective size of the orifice, and the bimetallic strip functions to move the valve element farther into the orifice 278 so as to decrease its effective size with higher temperatures. It will be understood that the bimetallic thermostatic element 273 and valve element 277 entering the orifice 278 are substantially the equivalent of the thermostat 255, plunger 254 and thin plate orifice 253 and the corresponding parts 134, 129 and 124 forming the turbulent orifice for the front pump 90. These two different types of thermostatically controlled orifices may be substituted one for the other and provide substantially the same results. The bimetallic strip of the thermostat 273, like the thermostats 255 and 134, is at substantially the same temperature as the oil in the sump 105.

The mechanism for downshifting the transmission automatically as a result of a decrease in vehicle speed includes a pressure responsive Bourdon tube. This tube is a flexible metal tube in communication with the fluid pressure in the discharge conduit 103 for the pump 91. When the pressure in the conduit 103 increases, the end of the tube 279a will move from its position shown in full lines to its dotted line position as seen in Fig. 16 and will retract to its illustrated position on a decrease in pressure in the conduit 103. The end 279a of the tube actuates an electric switch 280 which comprises a pair of contacts 281 and 282 adapted to be bridged by a switch arm 283. The end of the Bourdon tube 279 actuates the switch arm 283 when the pressure increases in the conduit 102 to open the switch 280 as is apparent.

The switch 280 is connected in series with an electric battery 284 and with an electric solenoid 285 so as to close the electric circuit through the solenoid to energize the latter when the switch is closed. The solenoid 285 comprises a winding 286 and an armature 287 which is drawn into its illustrated position when the winding is energized.

A kickdown switch 288 is connected in parallel with the switch 280. The switch 288 comprises contacts 289 and 290 adapted to be bridged by a switch arm 291, so as to act similar to the switch 280 in completing the electric circuit through the solenoid 285. The switch arm 291 is actuated by a lever 292 which in turn is actuated by a thrust rod 293 that is acted on by the vehicle accelerator 294. The arrangement is such that when the vehicle accelerator is moved to an open throttle kickdown position, it moves the thrust rod 293 to the left as seen in the figure to contact the lever 292 and move it counter-clockwise so that it closes the switch 288.

In operation, the Fig. 16 control arrangement functions in substantially the same way to upshift the transmission automatically from first speed ratio to second speed ratio after the manual control lever 175 has been put into its second speed position and upon an increase of vehicle speed. As the vehicle speed increases, the end 279a of the pressure sensitive Bourdon tube 279 opens the switch 282, and thereafter the manual control level 175 may be manually moved into its third speed position to upshift the transmission into this speed ratio. Upon a subsequent decrease in vehicle speed, the Bourdon tube moves back into its illustrated position and closes the switch 280 to complete an electric circuit through the battery 284 and solenoid 285 to move the plunger 287 up into its illustrated position and thereby move the lever 175 and the valves 163 and 164 back into their illustrated positions to downshift the transmission into second speed ratio. A subsequent further decrease in vehicle speed will cause a shifting of the valve piston 222 from its second speed ratio position back into its illustrated first speed ratio position causing a disengagement of the brake 20, as has been described, and the transmission is thereupon in first speed ratio.

A forced downshift from third speed ratio to second speed ratio may be caused by moving the accelerator 294 into an open throttle kickdown position to close the switch 288, and this also has the effect of energizing the solenoid 285 so as to thereby cause it to move the lever 175 back into its illustrated second speed position from its third speed position.

My improved transmission controls include an improved mechanism for providing a smooth, gradual engagement of a friction engaging means for starting an automotive vehicle from rest. This mechanism includes a turbulent restriction for relieving the discharge of a fluid pump driven by the drive shaft of the transmission, and a thermostatic control for the turbulent orifice and a viscous restriction in the inlet conduit for the pump which compensate for changes in viscosity of the fluid with changes in temperature. In order to avoid any unnecessary pumping of fluid in the higher gear ratios of the transmission and in order to provide a substantially closed system for a pump driven by the driven shaft of the transmission for starting the vehicle engine by pushing or towing the vehicle, my improved transmission control mechanism includes means for closing or reducing in size the turbulent orifice in the higher gear ratios of the transmission.

My transmission controls advantageously apply different fluid engaging pressures to one of the friction clutches (clutch C-2) in the transmission, which clutch is engaged for both direct forward drive and for reverse drive. Since this clutch takes only a portion of engine torque in direct drive as contrasted with the entire engine torque for reverse drive, a smaller fluid engaging pressure is required and necessary for giving a smooth engagement of this clutch for completing direct drive.

My improved controls advantageously maintain the reverse brake 21 engaged in the neutral condition of the shift valving for the transmission. An engagement of the friction clutch C-2 for a completion of the reverse drive through the transmission, rather than an engagement of the brake 21, which is less adapted for providing a smooth completion of the power train, is thus assured.

The transmission controlling mechanism shown in Fig. 14 advantageously utilizes the transmission driven shaft pump for providing a signal according to driven shaft speed for automatically shifting the transmission between first and second speed ratios. This control arrangement also advantageously includes mechanism for returning the operator's manual control from a high speed ratio position to a second speed ratio position when the vehicle speed decreases below a predetermined value. The Fig. 16 control arrangement in addition includes means for automatically shifting the manual control lever under the control of the vehicle accelerator to downshift the transmission when the accelerator is moved to an open throttle kickdown position.

I wish it to be understood that my invention is not to be limited to the specific constructions and arrangements shown and described, except only insofar as the claims may be limited, as it will be apparent to those skilled in the art that changes may be made without departing from the principles of the invention.

I claim:

1. In a power transmission; the combination of a drive shaft; a driven shaft, means for completing a drive between said shafts and including a friction engaging means; a fluid pressure actuated piston for engaging said engaging means; and means for supplying a fluid pressure that increases with the speed of said drive shaft to said piston for an engagement of said engaging means and including a pump driven by said drive shaft, said transmission comprising a casing forming a sump for lubricating oil, said pump having its inlet connected with said sump for drawing oil out of the sump and having its outlet connected with said piston and a thin plate having an orifice therein, said orifice being connected with said pump output for relieving the pump output pressure and for regulating the pressure; and thermostatic means for varying the effective size of said orifice according to the temperature of the lubricating oil in said sump and flowing through said pump and including a plunger movable toward and away from said orifice and a helical thermostatic element expansible and contractible with the temperature of the oil and connected with said plunger for moving the plunger toward the orifice when the oil becomes hot and for moving it away from the orifice when the oil becomes cold.

2. In a power transmission mechanism; the combination of a drive shaft; a driven shaft; means for completing a drive between said shafts and including a fluid pressure engaged friction engaging means; and means for supplying a fluid pressure that increases with the speed of one of said shafts to said engaging means for an engagement thereof and including a pump driven by said lastnamed shaft and having an inlet and an outlet, said outlet being connected with said friction engaging means, means forming a viscous restriction in said inlet having a surface of substantial area over which fluid flows for providing a substantial fluid impediment due to the friction of the fluid on said surface, and means providing an orifice connected with said pump outlet for relieving the pump output pressure which orifice provides a sudden fluid restriction so as to promote fluid turbulence.

3. In a transmission; the combination of a drive shaft; a driven shaft; means for completing a drive between said shafts and including a fluid pressure engaged friction engaging means; and means for supplying an oil pressure that increases with the speed of said drive shaft to said engaging means for an engagement thereof and including a pump driven by said drive shaft, a transmission casing forming an oil sump, said pump having an inlet to draw oil from said sump and having an outlet which is connected with said friction engaging means, means forming a viscous restriction in said inlet having a surface of substantial area over which oil flows for providing a substantial fluid impediment due to the friction of the oil on said surface and means providing an orifice connected with said pump outlet for relieving the pump output pressure which orifice provides a sudden fluid restriction so as to promote oil turbulence.

4. In power transmission mechanism; the combination of a drive shaft; a driven shaft; means for completing a drive between said shafts and including a fluid pressure engaged friction engaging means; means for supplying a fluid pressure that increases with the speed of one of said shafts to said engaging means for an engagement thereof and including a pump driven by said last-named shaft and having an inlet and an outlet, and means providing an orifice connected with said pump output for relieving the pump output pressure, said orifice being sharp edged and providing a sudden fluid restriction so as to promote fluid turbulence; means forming a viscous restriction in said inlet having a surface of substantial area over which fluid flows for providing a substantial fluid impediment due to friction of the fluid on said surface; and thermostatic means for regulating the effective size of said orifice in accordance with temperature changes.

5. In a transmission; the combination of a drive shaft; a driven shaft; means for completing a drive between said shafts and including a friction engaging means; a liquid pressure operated piston for engaging said engaging means; means for supplying a liquid pressure that increases with the speed of said drive shaft to said piston for an engagement of said friction engaging means and including a pump driven by said drive shaft and having an inlet and an outlet, a transmission casing forming an oil sump, said inlet being connected to said sump to draw oil therefrom, said outlet being connected with said piston and means providing a thin plate orifice connected with said pump outlet to discharge into said sump for relieving the pump output pressure; an oil screen in the inlet of said pump to form a viscous restriction and thermostatic means for regulating the effective size of said orifice in accordance with the temperature of said oil and including a thermostatic element acting on a valve element movable toward and away from said orifice.

6. In power transmission mechanism, the combination of a drive shaft, a driven shaft, means for providing a low speed ratio power train and a high speed ratio power train between said shafts, said low speed ratio power train including fluid pressure engaged friction engaging means for completing the drive, means for supplying a fluid pressure that increases with the speed of one of said shafts to said engaging means for an engagement thereof and including a pump driven by said last-named shaft and having its output connected with said engaging means and means providing a fluid relief orifice connected with the output of said pump for relieving the pump output pressure, a control member for changing the transmission from its low speed ratio to its high speed ratio, and means under the control of said last-named member for reducing the discharge through said orifice when the transmission is shifted into its high speed ratio.

7. In power transmission mechanism, the combination of a drive shaft, a driven shaft, means for providing a low speed ratio power train and a high speed ratio power train between said shafts, said low speed ratio power train including a first fluid pressure engaged friction engaging means for completing the power train and said high speed power train including a second fluid pressure engaged friction engaging means for completing the power train, a source of fluid pressure, a valve having two positions corresponding to each of the power trains for connecting the respective friction engaging means with said pressure source, said source including a pump driven by one of said shafts and means providing an orifice for relieving the pressure output of the pump for regulating the fluid pressure according to the speed of said last-named shaft and for giving a corresponding engagement to said first friction engaging means for completing the low speed ratio power train, and means under the control of said valve for reducing the effective size of said orifice when said valve is moved into its position corresponding to the high speed power train.

8. In power transmission mechanism, the combination of a drive shaft, a driven shaft, means for providing a low speed ratio power train and a high speed ratio power train between said shafts and including a first fluid pressure engaged friction engaging means which is engaged for said low speed ratio and a second fluid pressure engaged friction engaging means which is engaged along with said first-named friction engaging means for said high speed ratio, a source of fluid pressure, a valve having a low speed ratio and a high speed ratio position for connecting the respective friction engaging means with said fluid pressure source in its different positions, said source of fluid pressure including a pump driven by said drive shaft and means providing an orifice connected with the output of said pump for regulating its pressure output according to the speed of said drive shaft for initially completing the low speed power train, a source of fluid pressure provided in accordance with rotation of said driven shaft and including a pump driven by said driven shaft and having its output connected with the output of said drive shaft pump, said valve also having a tow start position in which both of said friction engaging means are connected with the outputs of said pumps, and means under the control of said valve for reducing the effective size of said orifice when the valve is moved into its high speed ratio position and for substantially closing said orifice when the valve is in its tow start position whereby both of said friction engaging means may be engaged on rotation of said driven shaft.

9. In power transmission mechanism for an automotive vehicle having a driving engine, the combination of a drive shaft, a driven shaft, a set of gearing having three elements, one of said elements being connected with said driven shaft, a pair of fluid pressure engaged friction clutches for connecting the other two elements respectively with said drive shaft, a first one of said friction clutches when engaged completing a power train between said shafts and both of said friction clutches when engaged completing another power train between said shafts, means for providing a fluid pressure that varies with the torque output of the vehicle engine, a valve for connecting said fluid pressure with either said first-named friction clutch or with both of said friction clutches for completing the power trains, and a pressure reducer valve connected with said fluid source and with said first-named valve for reducing the fluid pressure applied to said first clutch when both of said clutches are engaged.

10. In power transmission mechanism, the combination of a drive shaft, a driven shaft, means for providing three forward speed drives of different speed ratio and a reverse drive between said shafts, a pair of engaging means for respectively conditioning the transmission mechanism for forward and reverse drives and a pair of engaging means for completing each of the two higher forward drive power trains, a fluid pressure actuated piston for engaging each of said engaging means, a source of fluid pressure, valve mechanism for connecting the respective pistons with said fluid pressure source to complete the respective power trains, said valve mechanism comprising a first valve for respectively connecting the pistons for either of said forward or reverse conditioning engaging means with said pressure source and a second valve for connecting said pressure source with the pistons for either of the other two engaging means, and means for imparting simultaneous shifting movement to both of said valves.

11. In power transmission mechanism, the combination of a drive shaft, a driven shaft, means for providing low, intermediate and high forward drive power trains and a reverse drive between said shafts, said means including a friction brake for conditioning the transmission for the reverse drive and a friction clutch for completing the drive in low speed forward drive and for conditioning the transmission mechanism for the other two forward drives, a friction brake for completing the intermediate speed forward drive power train, and a friction clutch for completing the high speed forward drive power train and for completing the reverse drive power train when it and said first-named brake are engaged, a piston for engaging each of said brakes and clutches, a source of fluid pressure, and valve mechanism for operatively connecting said pressure source with the pistons for the respective brakes and clutches to complete the respective power trains, said valve mechanism comprising a first valve for connecting said pressure source alternatively with the piston for said first-named clutch or said first-named brake and a valve for alternatively connecting said pressure source with the piston for either said second-named brake or said second-named clutch, and a lever for causing simultaneous movement of both said valves.

12. In power transmission mechanism, the combination of a drive shaft, a driven shaft, a planetary gear set having first, second, third and fourth driving and drive controlling elements, the first one of said elements being connected with said driven shaft, means for providing a low speed forward drive between said shafts and including a first friction clutch connecting the second one of said elements with said drive shaft, means for providing a second speed forward drive between said shafts and including said first clutch and a first brake for said third one of said elements, means for providing a direct drive power train between said shafts and including said first clutch and a second clutch for connecting said third element with said drive shaft, means for providing a reverse drive power train between said shafts and including said second clutch and a second brake for said fourth element, a fluid pressure actuated piston for engaging each of said brakes and clutches, a source of fluid pressure, and valve mechanism for connecting respectively said pistons with said fluid pressure for providing the said various power trains through the transmission mechanism, said valve mechanism including a first valve for alternatively connecting the pistons for said first clutch and said second brake with said fluid pressure source and a second valve for alternatively connecting the pistons for said first brake and said second clutch alternatively with the fluid pressure source, and a lever for connecting said valves and for causing simultaneous shifting of the valves.

13. In power transmission mechanism, the combination of a drive shaft, a driven shaft, means for providing a forward drive power train between said shafts, means for providing a reverse drive power train between said shafts, said last-named means including two engaging means for completing the power train when both are engaged, a control member having forward drive, reverse drive and neutral positions for controlling the transmission mechanism and providing the respective drives through the mechanism, and means associated with said control member for causing the engagement of one of said engaging means in both the neutral and reverse positions of said member and in intermediate positions between these two positions for assuring the prior engagement of the last-mentioned engageable means before the other engageable means when a shift is made into reverse drive.

14. In power transmission mechanism, the combination of a drive shaft, a driven shaft, means for providing a forward drive power train between said shafts, means for providing a reverse drive power train between said shafts, one of said power trains including two fluid pressure operated friction engaging means for completing the power train and the other power train including a fluid pressure operated friction engaging means for completing the power train, a source of fluid pressure, and a valve having forward drive, reverse drive and neutral positions for connecting the respective fluid pressure operated friction engaging means with said pressure source to complete the respective power trains in the respective positions of the valve, and means associated with said valve for connecting one of said first-named friction engaging means with said pressure source in the neutral position of the valve for assuring the prior engagement of said last-named friction engaging means before the engagement of the other of said first two friction engaging means.

15. In power transmission mechanism, the combination of a drive shaft, a driven shaft, means for completing a drive between said shafts and including a one-way engaging means and a friction engaging means which when both are engaged complete the drive, friction engaging means in parallel with said one-way engaging means for locking up the one-way engaging means to provide a two-way drive between said shafts, a control member for said two friction engaging means and having a power train completing position in which only said first-named friction engaging means of the two friction engaging means is engaged and having a neutral position, and means for controlling said second-named friction engaging means by means of said member for causing a simultaneous engagement of both of said friction engaging means in a position intermediate the neutral and power train completing positions of the control member.

16. In power transmission mechanism, the combination of a drive shaft, a driven shaft, a planetary gear set having first, second, third and fourth driving and drive controlling elements, said first element being connected with said driven shaft, first and second fluid pressure operated friction clutches for connecting said second and third elements respectively with said drive shaft, a one-way brake for said fourth element for completing a forward drive between said shafts when said first clutch is engaged, a friction brake for said fourth element for completing a reverse drive between said shafts when it and said second clutch are engaged, a source of fluid pressure, and valve means having neutral, forward and reverse positions for connecting said pressure source with the respective brakes and clutches for providing the forward and reverse power trains in the respective positions of the valve means, said valve means being so arranged as to connect both said friction brake and said first-named clutch with said pressure source in a position intermediate its neutral and forward drive positions for providing a two-way forward drive between said shafts and connecting said friction brake with said pressure source in its neutral position and positions intermediate its neutral position and its reverse position for assuring the prior engagement of the friction brake before said second-named clutch when the valve means is being shifted into its reverse drive position.

17. In power transmission mechanism, the combination of a drive shaft, a driven shaft, means for providing a plurality of power trains of different speed ratio between said shafts, fluid pressure responsive means for shifting the transmission mechanism between its various power trains, and means for providing a fluid pressure that varies in accordance with the speed of one of said shafts and impressed on said fluid pressure responsive shifting means and including a pump driven by said last-named shaft, a thin plate having an orifice therein greater in diameter than length and connected with the output of said pump for relieving the fluid pressure output of the pump, and thermostatic means for changing the effective size of said orifice.

18. In power transmission mechanism, the combination of a drive shaft, a driven shaft, means for completing a plurality of power trains of different speed ratio between said shafts, fluid pressure responsive means for shifting the transmission mechanism between its various power trains, and means for providing a fluid pressure that varies in accordance with the speed of one of said shafts and including a pump driven by said shaft, said pump having a fluid inlet and a fluid outlet, means forming a viscous restriction in said inlet which imposes a substantial friction impediment to the flow of fluid through the inlet, and means providing a turbulent orifice connected with said pump outlet providing a sudden fluid restriction so as to promote fluid turbulence for regulating the pressure output of the pump.

19. In power transmission mechanism, the combination of a drive shaft, a driven shaft, means for providing a plurality of power trains of different speed ratio between said shafts, means including a fluid pressure responsive valve for shifting the transmission between its various speed ratios, means providing a fluid pressure that varies in accordance with driven shaft speed and including a pump driven by said last-named shaft, said pump having an inlet and an outlet, said outlet being connected with said fluid pressure responsive valve, means forming a viscous restriction in said pump inlet which imposes a substantial friction impediment to the flow of fluid through the inlet, and a thin plate having an orifice therein which is in communication with the outlet of said pump for relieving the pump output and for regulating it.

20. In power transmission mechanism, the combination of a drive shaft, a driven shaft, means for providing a plurality of power trains of different speed ratio between said shafts, means for shifting the transmission mechanism between its various speed ratio power trains and including a fluid pressure responsive shift valve having a position corresponding to each of the various power trains, means for providing a fluid pressure that varies in accordance with the speed of said driven shaft and including a pump having an inlet and an outlet and driven by the driven shaft, means forming a viscous restriction in said pump inlet which imposes a substantial friction impediment to the flow of fluid through the inlet, means providing a turbulent orifice connected with said pump outlet for relieving the pump output pressure and providing a sudden fluid restriction so as to promote fluid turbulence, and thermostatic means for changing the effective size of said orifice in accordance with changes in temperature.

21. In a transmission, the combination of a drive shaft, a driven shaft, means for providing a plurality of power trains of different speed ratio between said shafts, means for shifting the transmission mechanism between its various speed ratios and including a fluid pressure responsive valve having a position corresponding to each of the speed ratios, means for providing an oil pressure that varies in accordance with the speed of said driven shaft and including a pump driven by said driven shaft and having an outlet and an inlet, a transmission casing forming an oil sump, said inlet being connected to draw oil out of said sump, means forming a viscous restriction in said pump inlet for providing a substantial fluid impediment due to the flow of oil over a relatively large area of the restriction, a thin plate having an orifice therein and connected with said pump outlet for relieving the fluid pressure discharged by the pump, said pump outlet being connected with said valve for shifting the valve, a thermostatic element responsive to the temperature of said oil, and a valve element controlled by said thermostatic element so that said valve element moves to close said orifice upon an increase in oil temperature.

22. In a transmission, the combination of a drive shaft, a driven shaft, means for providing a plurality of power trains of different speed ratio between said shafts, means including a fluid pressure responsive valve for shifting the transmission mechanism between its various power trains and having a position corresponding to each of the power trains, means for providing a fluid pressure that varies in accordance with the speed of said driven shaft and including a pump driven by said driven shaft, a casing for the transmission providing a sump for lubricating oil, said pump having an outlet connected with said valve and having an inlet connected with said sump for drawing oil out of the sump, means forming an orifice connected with the pump outlet for relieving the fluid pressure pump output, and thermostatic means for changing the effective size of said orifice in accordance with oil temperature and including a spiral thermostatic element and a valve plunger connected with said thermostatic element and moved thereby into closer proximity with the orifice to decrease its effective size upon an increase in oil temperature.

23. In a transmission mechanism, the combination of a drive shaft, a driven shaft, means providing a plurality of power trains of different speed ratio between said shafts and including a low ratio power train and a high ratio power train, liquid pressure responsive means for completing each of said power trains, a source of liquid pressure, valve means for connecting said liquid pressure source with the respective pressure responsive means for completing each of the low and high ratio power trains, a manually operable selector lever connected with said valve means and having a position corresponding to each of the high and low ratio power trains, and speed responsive means controlled by said driven shaft for moving said selector lever from its high ratio position to its low ratio position when the speed of said driven shaft drops below a predetermined value, said speed responsive means including a liquid pump driven by said driven shaft and means providing a liquid relief orifice connected with the output of the pump for providing a liquid pressure that varies with driven shaft speed.

24. In transmission mechanism, the combination of a drive shaft, a driven shaft, means providing a plurality of power trains of different speed ratio between said shafts and including a high speed ratio power train and a low speed ratio power train, fluid pressure responsive means for completing each of said power trains, a source of fluid pressure, valve means for connecting said pressure source with said fluid pressure responsive means for completing each of the power trains, a selector lever connected to move said valve means, said selector lever having a high speed ratio position and a low speed ratio position, and speed responsive means under the control of said driven shaft for moving said selector lever from its high ratio position to its low ratio position when the speed of the driven shaft has dropped below a predetermined value, said speed responsive means including a fluid pressure piston operative when energized to move the selector lever into its low speed position from its high speed position and a valve for connecting said pressure source with said piston when the speed of the driven shaft drops below said predetermined value.

25. In transmission mechanism, the combination of a drive shaft, a driven shaft, means providing a plurality of power trains of different speed ratio between said shafts and including a high ratio power train and a low ratio power train, a selector member for shifting the transmission mechanism between its low and high speed ratio power trains and having a position corresponding to each of the power trains, and means for moving said selector member between its said two positions and including a pump driven by said driven shaft, means providing an orifice connected with the output of the pump for relieving the pump output pressure so that it varies according to driven shaft speed, a Bourdon tube connected with the output of said pump and having a free end that moves in accordance with changes in pressure in the tube, and means operatively connecting the free end of said tube and said selector member so that the 26. In transmission mechanism, the combination of a drive shaft, a driven shaft, means providing a plurality of power trains of different speed ratio between said shafts and including a low speed ratio power train and a high speed ratio power train, means including a manually operated selector lever for shifting the transmission mechanism between its low and high speed ratio power trains, and means for moving said selector lever automatically in accordance with the speed of the driven shaft and including a pump driven by said driven shaft, means defining an orifice for the relief of the output fluid pressure of the pump, a Bourdon tube connected with the output of said pump and having an end that moves in accordance with the pressure of the pump, a switch actuated by said end of the Bourdon tube, and electromagnetic means connected with said switch and operative to move said selector lever between its said two positions when said switch is actuated.

27. In transmission mechanism for an automotive vehicle, the combination of a drive shaft, a driven shaft, means providing a low and a high speed ratio power train between said shafts, an accelerator for the vehicle, means for shifting between said speed ratios and including a manual selector lever having a position corresponding to each of the speed ratios, and means including a control device operatively associated with said selector lever and said accelerator and actuated by said accelerator when it is moved to a certain open throttle kickdown position for moving said selector lever from its high speed ratio position to its low speed ratio position when the accelerator is moved to its said open throttle kickdown position.

28. In transmission mechanism, the combination of a drive shaft, a driven shaft, means providing a low speed power train between said shafts and including fluid pressure engaged means for completing the power train, means for providing a high speed power train between said shafts and including a fluid pressure engaged means for completing the power train, a source of fluid pressure, valve means effectively between said pressure source and said fluid pressure engaged means for connecting the pressure source and said last-named means to respectively complete either of the two power trains, a manual selector lever connected with said valve means and having a high ratio position and a low ratio position, an accelerator for the vehicle, and means under the control of said accelerator for moving said selector lever from its high speed ratio position to its low speed ratio position when the accelerator is moved to an open throttle kickdown position and including an electric switch actuated by the accelerator in its said kickdown position and operatively connected with an electromagnet which when operative moves the selector lever from its high speed ratio position to its low speed ratio position.

29. In power transmission mechanism, the combination of a drive shaft, a driven shaft, means providing a plurality of power trains of different speed ratio between said shafts, fluid pressure responsive means for shifting the transmission between its various speed ratio power trains, means for providing a fluid pressure that varies in accordance with the speed of said driven shaft and including a pump driven by said driven shaft and having an inlet and an outlet, said outlet being connected with said fluid pressure responsive means, means forming a viscous restriction in said inlet for providing a substantial fluid impediment due to the flow of fluid over a relatively large area of the restriction and comprising a fluid screen through which the fluid flows in entering the pump, and means providing an orifice connected with said pump outlet for relieving the pump pressure and providing a sudden fluid restriction so as to promote fluid turbulence.

30. In power transmission mechanism, the combination of a drive shaft, a driven shaft, means for providing low and high speed ratio power trains between said shafts, fluid pressure responsive means for shifting the transmission mechanism between its low and high speed ratios, means for providing a fluid pressure that varies in accordance with the speed of said driven shaft and including a pump driven by said driven shaft, said pump having an outlet which is connected with said fluid pressure responsive means for shifting the latter, means providing an orifice connected with the output of said pump for regulating the pump pressure according to driven shaft speed, and thermostatic means for regulating the effective size of said orifice in accordance with temperature and including a bimetallic strip anchored at one end and a valve element carried by said strip at its other end and adapted to move toward and away from said orifice along with the end of the strip to which it is attached.

31. In a power transmission, the combination of a drive shaft, a driven shaft, means for providing low and high speed ratio power trains between said shafts, means for shifting the transmission mechanism between its two speed ratio trains and including a fluid pressure responsive valve, means for providing a liquid pressure that varies in accordance with the speed of the driven shaft and connected with said fluid pressure responsive valve for shifting the valve, said last-named means including a pump driven by said driven shaft, a transmission casing forming a sump for lubricating oil, said pump having an inlet and an outlet, said inlet being connected with said sump to draw oil therefrom, an oil screen on the inlet end of said pump to form a viscous liquid restriction for providing a substantial impediment to the flow of liquid into the pump, means forming an orifice connected with the outlet of said pump, and thermostatic means for regulating the effective size of said orifice in accordance with the temperature of the oil and including a bimetallic strip which is in communication with the oil to be responsive to the temperature of it, said strip being anchored at one end and having a valve element attached to it at its opposite end which moves toward and away from the orifice along with said latter end of the strip.

32. In power transmission mechanism, the combination of a drive shaft, a driven shaft, means for completing a drive between said shafts and including fluid pressure engaged friction engaging means, a pump driven by one of said shafts having an inlet and an outlet, and a plate having an orifice therein connected with said pump outlet for relieving the fluid pressure output of the pump, said plate being thin and said orifice having greater diameter than length to promote turbulent flow through the orifice for causing the fluid pressure applied to the engaging means to gradually increase with gradual increases in speed of said last-named shaft substantially the same regardless of temperature and viscosity changes of the fluid, said pump outlet being connected to said engaging means for applying said gradually increasing fluid pressure on said friction engaging means to cause the engagement thereof to gradually increase in intensity.

33. In a transmission, the combination of a drive shaft, a driven shaft, a casing for the transmission and forming a sump for lubricating oil for the transmission, means for completing a drive between said shafts and including fluid pressure engaged friction engaging means, said friction engaging means including a fluid pressure responsive piston for engaging the engaging means, a pump driven by one of said shafts and having an inlet connected with said sump and having an outlet, and a plate having an orifice therein connected with said pump outlet for relieving the pump output, said plate being thin and said orifice having greater diameter than length to promote turbulent flow through the orifice for causing the fluid pressure output of said pump to gradually increase with gradual increases in speed of said last-named shaft substantially the same regardless of temperature and viscosity changes of the fluid, said pump outlet being connected to said piston for applying said gradually increasing fluid pressure on said piston to cause the engagement of said friction engaging means to gradually increase in intensity.

34. In power transmission mechanism, the combination of a drive shaft, a driven shaft, means for providing a power train between said shafts and including first and second friction engaging means both of which are engaged to complete the train, means for causing the engagement of said first friction engaging means in accordance with the speed of said drive shaft, a control member having a drive position and a neutral position and causing said second friction engaging means to be engaged and rendering said speed responsive means effective for controlling engagement of said first engaging means in the drive position of the control member and causing the engagement of said second friction engaging means to the exclusion of said first friction engaging means in the neutral position of the control member for assuring the prior engagement of said second engaging means before the other.

35. In power transmission mechanism, the combination of a drive shaft, a driven shaft, means for completing a drive between said shafts and including fluid pressure engaged friction engaging means, a pump having an inlet and an outlet and driven by one of said shafts, a plate having an orifice therein connected with said pump outlet for relieving the fluid pressure output of the pump, and thermostatic means for changing the effective size of said orifice with changes in temperature of the fluid, said plate being thin and said orifice having greater diameter than length to promote turbulent flow through the orifice and cooperating with said thermostatic means for causing the fluid pressure output of the pump to gradually increase with gradual increases in the speed of said pump substantially the same regardless of changes in temperature and viscosity of the fluid, said pump outlet being connected to said engaging means for applying said gradually increasing fluid pressure on said friction engaging means to cause the engagement thereof to gradually increase in intensity with increase in speed of the pump.

36. In a fluid system, a rotary element, a pump driven by said element, means providing an orifice connected with the outlet of said pump for relieving the pump output pressure, a bendable strip having a part more or less closing said orifice, said bendable strip having the fluid flowing through said orifice impinging thereon and thus being subject to changes in temperature and viscosity of the fluid thereby to move away from said orifice so that said part uncovers the orifice to a greater extent as the fluid temperature decreases and the fluid viscosity increases, and a viscous restriction on the inlet end of said pump providing a substantial surface over which the fluid entering the pump may flow, said orifice being sharp edged to promote turbulent flow therethrough and cooperating with said viscous restriction and with said bendable strip so that the output pressure of said pump increases in accordance with the speed of the rotary element and pump and remains substantially the same for a given speed of said pump and rotary element regardless of changes in temperature and viscosity of the fluid.

37. In power transmission mechanism, the combination of a drive shaft, a driven shaft, means for providing low and high speed ratio power trains between said shafts, fluid pressure responsive means for changing the transmission mechanism between its low and high speed ratios, a pump driven by said driven shaft and having an outlet which is connected with said fluid pressure responsive means for shifting the latter, means providing an orifice connected with the outlet of said pump for relieving the pump pressure so that it increases coordinately with coordinate increases in driven shaft speed, and a bendable strip having a part more or less closing said orifice and having the fluid flowing through the orifice impinging thereon and thus being subject to changes in temperature and viscosity of the fluid thereby to move away from said orifice so that said part uncovers the orifice to a greater extent as the fluid temperature decreases and the fluid viscosity increases so that the pump output pressure remains approximately the same regardless of changes in temperature and viscosity of the fluid.

38. In power transmission mechanism, the combination of a drive shaft, a driven shaft, means for providing low and high speed ratio power trains between said shafts, means for changing the transmission mechanism from its low speed power train to its high speed power train and including a fluid pressure responsive control valve movable against a spring from a low speed ratio position to a high speed ratio position, a pump driven by said driven shaft and having its outlet connected to apply output pump pressure to said valve tending to shift the valve against its spring from its low speed position to its high speed position, means providing an orifice connected with the outlet of said pump for relieving the pump output pressure and causing the pump output pressure to increase coordinately with coordinate increases in pump speed, and a bendable strip having a part more or less closing said orifice and having the fluid flowing through the orifice impinging on the strip tending to move the strip away from the orifice so that said part uncovers the orifice to a greater extent, said orifice being sharp edged so as to provide turbulent flow therethrough and cooperating with said bendable strip so as to maintain the output pressure of said pump approximately the same for a given speed of said pump regardless of changes in temperature and viscosity of the fluid.

39. In power transmission mechanism, the combination of a drive shaft, a driven shaft, means for providing low and high speed ratio power trains between said shafts, fluid pressure responsive means for changing the transmission mechanism between its low and high speed ratios, a pump driven by said driven shaft and having an outlet which is connected with said fluid pressure responsive means for shifting the latter, means providing an orifice connected with the outlet of said pump for relieving the pump pressure so that it increases coordinately with coordinate increases in driven shaft speed, and a bi-metallic strip having a part more or less closing said orifice and having fluid flowing through the orifice impinging thereon and thus being subject to changes in temperature and viscosity of the fluid thereby to move away from said orifice so that said part uncovers the orifice to a greater extent as the fluid temperature decreases causing the strip to flex due to its bi-metallic construction and as the fluid viscosity increases due to the resultant greater fluid impinging force on the strip, whereby the pump output pressure remains approximately the same regardless of changes in temperature and viscosity of the fluid.

40. A drive engagement control adapted for use in a transmission for a self-propelled vehicle having an engine, a driven shaft and gradually engageable coupling means for establishing drive therebetween, comprising a fluid pressure actuated mechanism for effecting coupling engagement, and a fluid pressure control system for regulating the coupling engagement pressure, said system including a pump operatively connected to said fluid pressure actuated mechanism, a pressure regulating orifice through which the output from said pump can discharge, and an orifice blocking valve to inhibit flow through said orifice capable of being actuated in response to the establishment of certain drive ratios.

41. A clutch control adapted for use in a transmission for self-propelled vehicles having an engine, a driven shaft and a friction clutch for establishing driven therebetween, comprising a fluid pressure actuated mechanism for effecting clutch engagement, and a fluid pressure control system for regulating the clutch engagement pressure, said system including a pump operatively connected to said fluid pressure actuated mechanism, a pressure regulating orifice through which the output from said pump can discharge, and an orifice blocking valve to block the flow through said orifice capable of being actuated in response to the establishment of certain transmission ratios.

42. In a self-propelled vehicle having an engine, a driven shaft and a friction clutch for establishing drive therebetween, a fluid pressure operated mechanism for effecting clutch engagement, and an automatic fluid pressure control system for graduating clutch engagement pressure comprising an engine driven pump, an orifice through which the pump output can discharge, thereby to build up fluid pressure in the pressure operated mechanism and to increase the clutch engaging pressure as the speed of the engine increases, said orifice being of a fixed thin plate type to minimize the effect of changes in viscosity of the fluid on the pressure built up by the flow of fluid through it.

43. In power transmission mechanism, the combination of a drive shaft, a driven shaft, means for providing a power train between said shafts and including a friction clutch and a friction brake both of which must be engaged to complete the train, a control member having a drive position and a neutral position for controlling the transmission mechanism and connected with said clutch to engage the clutch in the drive position and to disengage the clutch in the neutral position, and means associated with said control member for causing the engagement of said friction brake in both said neutral and drive positions of said control member and in intermediate positions therebetween for assuring the prior engagement of said brake before said clutch when said control member is shifted from its neutral position to its drive position to complete said power train.

References Cited in the file of this patent

UNITED STATES PATENTS

| Number | Name | Date |
|---|---|---|
| 752,953 | Brush | Feb. 23, 1904 |
| 1,213,794 | Chenoneth | Jan. 23, 1917 |
| 1,598,242 | Chadeayne | Aug. 31, 1926 |
| 1,609,782 | Small et al. | Dec. 7, 1926 |
| 1,849,590 | Phillips | Mar. 15, 1932 |
| 1,865,690 | Hanson | July 5, 1932 |
| 1,866,891 | Jackson | July 12, 1932 |
| 1,905,284 | Heitger | Apr. 25, 1933 |
| 1,943,527 | Hayes | Jan. 16, 1934 |
| 1,958,410 | Schaeren | May 15, 1934 |
| 1,991,124 | Sharpe | Feb. 12, 1935 |
| 2,088,782 | Ford | Aug. 3, 1937 |
| 2,141,096 | Thurber | Dec. 20, 1938 |
| 2,150,950 | Thoma | Mar. 21, 1939 |
| 2,163,202 | Kegresse | June 30, 1939 |
| 2,169,554 | Buchanan | Aug. 15, 1939 |
| 2,198,722 | Horvath | Apr. 30, 1940 |
| 2,207,809 | Lauffer | July 16, 1940 |
| 2,213,743 | Miner | Sept. 3, 1940 |
| 2,221,393 | Carnegie | Nov. 12, 1940 |
| 2,223,716 | Bojesen | Dec. 3, 1940 |
| 2,233,979 | Horvath | Mar. 4, 1941 |
| 2,270,127 | Kravits | Jan. 13, 1942 |
| 2,282,949 | Dolza | May 12, 1942 |
| 2,284,980 | Mantle | June 2, 1942 |
| 2,291,241 | Lawrence | July 28, 1942 |
| 2,314,554 | Pennington | Mar. 23, 1943 |
| 2,343,955 | Cotterman | Mar. 14, 1944 |
| 2,372,817 | Dodge | Apr. 3, 1945 |
| 2,375,440 | Roche | May 8, 1945 |
| 2,402,248 | Hale | June 18, 1946 |
| 2,404,623 | Dodge | July 23, 1946 |
| 2,407,289 | La Brie | Sept. 10, 1946 |
| 2,432,272 | Bariffi | Dec. 9, 1947 |
| 2,446,730 | Wemp | Aug. 10, 1948 |
| 2,485,688 | Banker | Oct. 25, 1949 |
| 2,519,050 | Kelbel | Aug. 15, 1950 |
| 2,604,197 | Livermore | July 22, 1952 |
| 2,627,189 | McFarland | Feb. 3, 1953 |
| 2,633,760 | Kelley | Apr. 7, 1953 |

FOREIGN PATENTS

| Number | Country | Date |
|---|---|---|
| 48,019 | France (Addition to No. 809,102) | Oct. 16, 1937 |
| 500,311 | Great Britain | Feb. 1, 1939 |